US011878829B2

(12) United States Patent
McLenithan et al.

(10) Patent No.: US 11,878,829 B2
(45) Date of Patent: Jan. 23, 2024

(54) PACKAGING MACHINE WITH INDEPENDENTLY CONTROLLABLE MOVERS

(71) Applicant: NEW SPS POD, LLC, Mt. Prospect, IL (US)

(72) Inventors: Thomas M. McLenithan, Mt. Prospect, IL (US); Andrzej Kepinski, Mt. Prospect, IL (US); John Paselsky, Erlanger, KY (US); Jeff Williams, Cincinnati, OH (US); Richard McKenzie, Cincinnati, OH (US); Richard Bishop, Erlanger, KY (US)

(73) Assignee: NEW SPS POD, LLC, Mt. Prospect, IL (US)

( * ) Notice: Subject to any disclaimer, the term of this patent is extended or adjusted under 35 U.S.C. 154(b) by 0 days.

(21) Appl. No.: 18/063,980

(22) Filed: Dec. 9, 2022

(65) Prior Publication Data

US 2023/0106482 A1 Apr. 6, 2023

Related U.S. Application Data

(63) Continuation of application No. 17/226,591, filed on Apr. 9, 2021, now abandoned, which is a continuation (Continued)

(51) Int. Cl.
*B65B 3/02* (2006.01)
*B65B 9/04* (2006.01)
(Continued)

(52) U.S. Cl.
CPC .............. *B65B 9/042* (2013.01); *B65B 3/022* (2013.01); *B65B 31/00* (2013.01); *B65B 39/14* (2013.01);

(Continued)

(58) Field of Classification Search
CPC ......... B65B 3/022; B65B 9/042; B65B 31/00; B65B 39/14; B65B 41/12; B65B 43/52;
(Continued)

(56) References Cited

U.S. PATENT DOCUMENTS 3,218,776 A * 11/1965 Cloud ..................... B65B 47/10 53/546
5,255,720 A * 10/1993 McPherson ........... B67C 3/2608 141/89
(Continued)

*Primary Examiner* — Thomas M Wittenschlaeger
*Assistant Examiner* — David G Shutty
(74) *Attorney, Agent, or Firm* — Reed Smith LLP; Nina Habib Borders

(57) ABSTRACT

A packaging machine is provided for producing single and multiple compartment film wrapped pouches. Multiple linear motors allow aspects of the forming, filling, cutting and discharging to run at different speeds. The pouches are formed, filled and discharged from platens that are secured to movers that proceed through the packaging process by following magnetic fields created by independently controlled linear motors. Overall, cycle time is decreased as a result of speeding up parts of the process, including the platen return process, possible because there is no mechanical connection and not a single conveyor moving the platens while the other parts of the process may be simultaneously slowed down or even temporarily stopped. Changeover of platens, to accommodate different products, such as single compartment pouch to multiple compartment pouches, is also simplified because platens are simply connected to the movers and are thus easily removed and replaced.

32 Claims, 14 Drawing Sheets

Related U.S. Application Data of application No. 15/276,287, filed on Sep. 26, 2016, now abandoned.

(60) Provisional application No. 62/232,570, filed on Sep. 25, 2015.

(51) Int. Cl.

| | |
|---|---|
| ***B65B 31/00*** | (2006.01) |
| ***B65B 39/14*** | (2006.01) |
| ***B65B 41/12*** | (2006.01) |
| ***B65B 43/52*** | (2006.01) |
| ***B65B 47/02*** | (2006.01) |
| ***B65B 51/00*** | (2006.01) |
| ***B65B 61/06*** | (2006.01) |
| ***B65D 65/46*** | (2006.01) |
| ***C11D 17/04*** | (2006.01) |

(52) U.S. Cl.

CPC .............. *B65B 41/12* (2013.01); *B65B 43/52* (2013.01); *B65B 47/02* (2013.01); *B65B 51/00* (2013.01); *B65B 61/06* (2013.01); *B65D 65/46* (2013.01); *C11D 17/042* (2013.01); *C11D 17/045* (2013.01)

(58) Field of Classification Search

CPC ......... B65B 47/02; B65B 51/00; B65B 61/06; B65B 65/46

See application file for complete search history.

(56) References Cited

U.S. PATENT DOCUMENTS

| | | | | | |
|---|---|---|---|---|---|
| 5,408,804 | A * | 4/1995 | Schroder | B65D 81/3294 | 53/240 |
| 5,682,733 | A * | 11/1997 | Perrone | B65B 9/04 | 53/553 |
| 5,965,963 | A * | 10/1999 | Chitayat | H02K 41/031 | 318/135 |
| 6,874,300 | B2 * | 4/2005 | Di Lauretis | B65B 9/04 | 53/511 |
| 6,876,107 | B2 * | 4/2005 | Jacobs | B29C 66/83413 | 318/135 |
| 6,876,896 | B1 * | 4/2005 | Ortiz | B29C 65/7867 | 318/135 |
| 7,123,854 | B1 * | 10/2006 | Cellura | G03G 21/0052 | 399/92 |
| 7,597,187 | B2 * | 10/2009 | Bausenwein | B41F 13/00 | 198/619 |
| 8,397,896 | B2 * | 3/2013 | Kleinikkink | B23Q 7/1447 | 198/747 |
| 8,662,880 | B2 * | 3/2014 | Fowler | B65B 47/10 | 426/512 |
| 8,896,241 | B2 * | 11/2014 | Wernersbach | H02P 31/00 | 318/135 |
| 9,008,831 | B1 * | 4/2015 | Jacobs | B65G 47/52 | 700/214 |
| 9,809,336 | B2 * | 11/2017 | Pallotta | B65B 9/00 | |
| 10,259,602 | B2 * | 4/2019 | Pallotta | B65B 9/023 | |
| 10,689,202 | B2 * | 6/2020 | Papsdorf | B65G 35/02 | |
| 10,696,488 | B2 * | 6/2020 | Papsdorf | B65G 35/06 | |
| 10,717,606 | B2 * | 7/2020 | Papsdorf | G05B 19/042 | |
| 2003/0109060 | A1 * | 6/2003 | Cook | G01N 35/1002 | 436/180 |
| 2013/0219827 | A1 * | 8/2013 | Pallotta | B65B 57/145 | 493/186 |
| 2013/0292884 | A1 * | 11/2013 | Anderson | A61J 3/10 | 264/491 |
| 2014/0345064 | A1 * | 11/2014 | Koch | C11D 17/042 | 510/439 |
| 2015/0336692 | A1 * | 11/2015 | Brandt Sanz | C11D 17/042 | 53/450 |
| 2016/0114914 | A1 * | 4/2016 | Kepinski | B65B 1/02 | 53/436 |
| 2016/0159578 | A1 * | 6/2016 | Bierbooms | B65G 54/02 | 198/794 |
| 2016/0159585 | A1 * | 6/2016 | Wernersbach | B65G 54/025 | 198/619 |
| 2016/0176556 | A1 * | 6/2016 | Jaouen | B65B 35/30 | 53/168 |
| 2016/0257089 | A1 * | 9/2016 | Deering | B31B 50/062 | |
| 2016/0340068 | A1 * | 11/2016 | Brandt Sanz | B65B 1/02 | |
| 2016/0362200 | A1 * | 12/2016 | Brandt Sanz | B65B 39/007 | |
| 2018/0290774 | A1 * | 10/2018 | Fowler | B65B 9/042 | |
| 2023/0106482 | A1 * | 4/2023 | McLenithan | C11D 17/042 | 53/453 |

* cited by examiner

PACKAGING MACHINE WITH INDEPENDENTLY CONTROLLABLE MOVERS

CROSS-REFERENCE TO RELATED APPLICATION

This application is continuation of U.S. patent application Ser. No. 17/226,591, filed Apr. 9, 2021 which is a Continuation of U.S. patent application Ser. No. 15/276,287, filed Sep. 26, 2016 which claims the benefit of U.S. Provisional Patent Application 62/232,570 filed Sep. 25, 2015, all of which are hereby incorporated by reference.

FIELD OF THE INVENTION

The present invention relates to a packaging machine wherein a pouch is processed through multiple stages along a closed loop system using independently controllable movers.

BACKGROUND OF THE INVENTION

A vast array of chemical products are manufactured, packaged and distributed as pouches wrapped in film that can be broken down when desired to release the contents therein. The pouches are commonly referred to as sachets, packets, water soluble pouches, etc. In general, the film wraps an accurate quantity of the product and prevents it from reacting with chemicals found in the environment until the film is broken down. In this way, greater control is achieved over when a reaction occurs in addition to improving the accuracy of dosing realized because there is no measurement of the chemical required by the user. The quantity of the accurately metered pouch contents is all that is used for the desired reaction.

The most common film used to wrap such pouches is water-soluble film which dissolves upon application of water. Other films are contemplated, however, including those that may be broken down by a different gas or liquid, or by increased or decreased pressure or temperature, or combinations thereof, which results in dissolution of the film and release of the contents therein. Among water-soluble film wrapped pouches, a common use is detergent pouches used for laundry, dishwashers and other uses, comprising detergent chemicals wrapped in water-soluble film. The pouches are placed in the dishwasher and washing machine with items to be washed, and through the process and exposure to water, the film is broken down, allowing the chemical cleaning agents contained in the pouches to be mixed and applied to break down contaminants on the dishes or clothes. As set forth above, one of the benefits of using such pouches is that the user achieves perfect dosing. In addition, to enhance the cleaning process that takes place, for example, in a washing machine or a dishwasher, it has become desirable to include multiple compartment pouches, containing multiple chemicals such as detergent, softener, color bleach, etc. all in a single pouch with multiple separate sealed pockets.

The pouches have, in the prior art, been created in a variety of ways. Drum technology is described in U.S. Pat. No. 3,218,776. In drum technology, a rotary cylindrical drum has a fixed number of wedges (with multiple molds formed therein) uniformly placed together, defining the pitch of the machine, and secured to the outer drum circumference. The molds in the wedges are substantially rectangle shaped cavities formed therein, and the pouches are formed in the molds. When the cylindrical drum rotates on its axis, the molds pass through multiple processing stations. First, a layer of water-soluble base film is overlaid the mold, and then a vacuum is applied from under the mold that draws the base film down into the void to line the void. Next, the film lined void passes under at least one filling head and the void is filled with detergent or any chemical desired to be encased in the pouch. Next, after the lined mold is filled, it passes through a station wherein a layer of lid film is laid over and bonded to the base film using water, thereby sealing the detergent within a completed pouch. Fixed knives then slice the film along the rotary direction and a rotating cutoff knife cuts the film between the rotating wedges. As the drum continues to rotate, the completed pouches are then expelled from the molds in the wedges (the vacuum is disengaged, such that the rotary movement of the drum and gravity cooperate to expel the pouches). In some prior art arrangements, a blowback is provided that reverses the vacuum and pushes air through the same holes where the vacuum was supplied, to assist in expelling the pouches therefrom.

There are a number of disadvantages with prior art drum technology for pouch creation. First and foremost, the drum necessarily always rotates at the same speed, and that speed is limited by the slowest stage of the process, the forming, filling, sealing, cutting and expulsion of the pouches. The speed of the entire process, and the number of pouches it can produce, is limited by the speed limitation of the slowest stage (usually filling) and, in drum technology, the rest of the machine must run at the same speed. There is a very limited amount of time in each step to perform the necessary processing function. Using a clock to illustrate the typical processing of a pouch with drum technology, for example, applying and drawing the base film down into the mold occurs roughly between 10:00 and 11:30 of the drum rotation. Filling occurs between 11:30 and 12:30 and the lid film is applied between 12:30 and 1:00. Between 1:00 and 3:00 the fixed knives and rotary cutoff knife cuts the film into pouches, and the vacuum is disengaged and the pouches are expelled from the molds onto a separate exit conveyor. The molds in the wedges then are emptied from 5:30 to 7:30 as the drum rotates, until the process begins again. The flexibility of the rotary drum is very limited because the entire process is built around and defined by the diameter of the drum. The location of the base film roll, filling heads, lid film and knives are all fixed for a certain size drum. The capability to run different products with a single drum is very limited because the size of the drum is fixed, the speed of rotation is limited by the slowest stage, and changeover requires the complete replacement of the drum. Even the number of wedges, which define the "pitch" of the machine (i.e. the number of segments the rotary drum is broken into) is limited and must be equally divisible by a common factor (drums will have a "pitch" of 24, 48, 72, etc. for example).

In addition to limited flexibility in changeover, the stage of filling pouches using drum technology has the serious limitation with respect to using multiple fills, as it is very difficult to fill more than a single product because of the limited period of time for the "filling" stage between 11:30 and 12:30 of the drum's rotation. The speed of the drum is limited as well, because any spillage of the fill chemical results in poorly formed or sealed pouches that will fail. In fact, spillage is a disaster for the pouch forming machine, because not only is the quality of the product compromised, but the machine has to be shut down and cleaned of the spillage. Thus, the "fill" speed is kept down to a safe low speed to prevent any disastrous spillage.

An improvement in recent years in pouch formation has been the evolution of continuous flatbed technology. The process has become elongated and more of an "oval" process, the work of forming, filling, sealing and cutting of the pouches occurring during flat, horizontal travel instead of rotary processing on a drum. In flat bed technology, a conveyor drives platens with molds horizontally through a base film application stage, vacuum stage, at least one filling stage, then through a lid application stage, and finally through the fixed knives and cutoff knife stage. In flat bed technology that is all done horizontally, and at the end of the flat conveyor, the completed pouches are discharged onto an exit conveyor. The conveyor that moves the platens through the stages in flatbed technology is an endless linked conveyor, continuously moving at the same speed through all the stations. Flatbed technology has a significant disadvantage of moving platens through the forming, feeling, sealing, cutting, discharge and return stations all at a single speed, limited by the speed of the slowest station, wherever that is. Flatbed technology allows more flexibility than drum technology, because the fill stage can be adjusted, and fill stations can even be added to increase speed (e.g. the molds can be half filled by a first fill head and then have the other half filled by a second fill head) or to create more products (two heads filling a bifurcated mold with powder on one side and liquid on the other side). Nonetheless, while flatbed technology does provide some improvement over the prior art, it still has disadvantages as a result of the continuous, endless conveyor that drives the molds and platens through the machine. The flatbed conveyor has a fixed length, so any changeover to an alternate group of platens (to produce a different film wrapped pouch product) necessarily requires a conveyor of the same length, and the pitch between platens or movers is always fixed because the entire conveyor is necessarily running at a single speed. The flatbed conveyor is a defined length and comprises a continuous and evenly spaced series of platens, i.e., it has the same pitch (space between successive platens) along the entire conveyor. While it is possible to change the form or the number of platens to produce a different film wrapped pouch product, the length of the conveyor will always be the same, the pitch will always be the same along the entire length of the conveyor, and the speed will always be limited to the fastest speed through the slowest station.

Thus, even current flatbed technology, while an improvement upon drum technology, still has a number of disadvantages and drawbacks. The inclusion of a continuous, mechanically linked conveyor as the mover that carries the platens and molds through the pouch manufacturing process, has a number of limitations. While the platens may be able to be changed, the changing of every link in a continuous mechanical conveyor is time consuming and complicated. In addition, as a result of the mechanical connection, the movers in prior art flatbed technology systems, all necessarily move at the same speed throughout the entire machine. The mechanically linked movers all move at a single speed, with an identical and fixed pitch between them.

SUMMARY

A packaging machine with movers that independently move through each of stage of the packaging process is described. The movers move independently around a track during the packaging process. A speed of the movers may change as the movers move around the track.

The packaging machine addresses problems of the prior art drum technology by dramatically improving the flexibility to create different products, and to allow some stages of the process, such as the return of the empty molds to the beginning of the process, after expelling the finished pouches, to proceed more quickly, even while other stages, such as the filling stage, proceed more slowly, among other things.

The packaging machine providing a machine wherein the platens are independently controllable and can be accelerated or decelerated through different parts of the process. The platens are accelerated at high speeds through part of the machine and decelerated through others where more processing time is required. This is possible in the packaging machine because the platens are not linked mechanically to each other or driven by a single speed conveyor drive motor. The movers are separate and independent from adjacent movers. Instead, the platens are secured to movers that are propelled by multiple sequential linear motors, each of which is independently controllable and adjustable instead of being part of a fixed mechanical conveyor. The multiple linear motors propel the movers through the process without any mechanical connection by using magnetic field manipulation, which allows the speed of the platens to be relatively slow through, for example, the fill stations, while the platens are moved at very high speed through the return after discharge of the completed pouches.

The movers, with the platens attached thereto, are equipped with magnets that allow them to move seamlessly through the process, from one linear motor to the next, by following magnetic fields created by the linear motors, without ever mechanically touching the sequential linear motors. The cycle time for the entire process is reduced, because the platens can be accelerated through some stages.

It is also very easy to modify the speeds at which the platens are processed because the linear motors are easily modified to change the magnetic field strengths, durations and patterns as necessary. The packaging machine is highly flexible and efficient because a single platen, which connects simply to an independent mover, is processed through the process at differing speeds, and those speeds, in each stage, can be adjusted with software changes without ever changing anything mechanical.

In one aspect, a packaging machine for making film wrapped pouches is described. The packaging machine includes multiple stages for making film wrapped pouches on platens. A track is provided through the multiple stages. Movers carry the platens through the multiple stages about the track. The movers move independently about the track through each of the multiple stages.

In another aspect, a packaging machine for film wrapped pouches is described. The packaging machine includes a track passing through a base film application stage, a filling stage, a lid film application stage. Independent movers are engaged to the track. The independent movers carry platens to the base film application stage, the filling stage, and the lid film application stage. The independent movers are provided with magnets. The movers are driven through the stages by magnetic fields of the linear motors. The platens include molds for forming film wrapped pouches.

In another aspect, a method of manufacturing film wrapped pouches is described. The method include providing platens with molds, and affixing the platens to movers. The movers are engaged to a track. The movers move independently around the track. A base layer of film is applied to the molds of the platens at a base layer stage. A vacuum pulls the base film down into the molds of the platens. The molds are filled with a chemical or other product. The lid film is bonded to the base film. The lid film and the base film are cut. The pouches are removed from the molds of the platens. The platens are moved back to the base layer stage at an accelerated speed.

The packaging machine includes a vacuum plenum and a vacuum belt providing limited port hole access to the vacuum plenum from the platen. The vacuum from the vacuum plenum is used to draw base film down and hold it within the mold, until a point when the vacuum is disengaged. The vacuum plenum is in communication with the molds to apply the vacuum to the molds during certain portions of the manufacturing process.

The packaging machine provides an improved film wrapped pouch production machine with improved flexibility. The packaging machine provides a manufacturing apparatus comprising multiple separate stages wherein the pouches being processed may be driven at different speeds throughout the apparatus.

The packaging machine provides a sequential manufacturing process wherein movers for the pouches are independently controllable throughout different stages. The packaging machine provides a pouch production machine wherein stations may be easily added, removed or replaced to change products and the speeds changed in some of the stages of processing without changing the speeds in other stages.

The packaging machine provides a pouch production machine wherein linear motors drive platens through along a track at different speeds in different stages to allow greater periods of times in some stages compared to other stages.

The packaging machine provides a manufacturing machine wherein the pouches being processed sequentially travel on movers throughout the process, the movers propelled by a series of linear motors generating magnetic fields that the movers follow.

The packaging machine provides a sequential manufacturing process around a loop wherein the pouches being processed travel on movers throughout the process, but the movers are not mechanically linked to each other.

The packaging machine provides a film wrapped pouch manufacturing process having flexibility to produce a greater number of products by virtue of having greater ability to control the speed at which the pouches are processed in the various stages of the process.

The packaging machine has multiple stages through which a pouch is processed. A mover carrying the pouch through the multiple stages around a track is provided wherein the mover is moved through each of said stages independently. The packaging machine has movers that proceed through a first stage with a first speed and acceleration characteristic and in a second stage at a second speed and acceleration characteristic, with the first and second speed and acceleration characteristics being independently controllable.

The packaging machine provided with movers that are driven through the multiple stages by multiple mechanically independent linear motors. Magnets affixed to the movers are propelled through the multiple stages by magnetic fields provided by the linear motors. The packaging machine has no mechanical connection between the magnets and the linear motors such that the pitch between the movers can change. The movers have a different pitch and run at different speeds in different stages of the machine.

The packaging machine has movers that are accelerated and decelerated through multiple stages independently in each of the multiple stages, the movers being simultaneously propelled at one speed in a first relatively slow stage of processing and propelled at a second speed in a second relatively fast stage.

The packaging machine is most specifically used to produce pouches wrapped in film, and the multiple stages comprise a fill stage wherein the pouch is propelled relatively slowly through the fill stage relative to other stages.

The present packaging machine comprises multiple stages through which a pouch is processed, and multiple movers, each mover carrying the pouch through the multiple stages for processing, but wherein the movers are mechanically independent. The movers are propelled by following magnetic fields created by a series of linear motors, with the multiple movers all having magnets affixed thereto that follow the magnetic fields. Platens having molds for pouch formation are removably secured to the movers, such that the platens are easily removed and replaced. The film wrapped pouch produced by the machine is easily changed by modifying or replacing the platens. In one example of the packaging machine, at least one fill station is provided for transferring a fluid product into the mold, with another fill station easily added or removed without modifying other stations.

The packaging machine is provided comprising multiple stages through which a pouch is processed, and movers carrying the pouches through the multiple stages. As set forth herein, a base film application and draw down stage is provided wherein the base film is drawn down into molds by applying a vacuum to the molds. In one aspect of the packaging machine, a vacuum plenum provides the vacuum to the molds. A vacuum belt with belt port holes moves over a slot in the vacuum plenum. The platen includes platen port holes that are synchronized with the belt port holes. The vacuum is drawn though holes in the mold, the platen port holes, the belt port holes, and through the vacuum plenum.

The vacuum plenum is in communication with the molds to apply the vacuum to the molds during certain portions of the manufacturing process. As the platens move past an end of the vacuum belt, the communication with the vacuum plenum is ended.

The packaging machine provides moving access to the vacuum plenum through the belt port holes and the platen port holes. Synchronization of the platen port holes to the belt port holes on the moving vacuum belt over the slot in the vacuum plenum provides the moving access.

DETAILED DESCRIPTION

Figure 1:
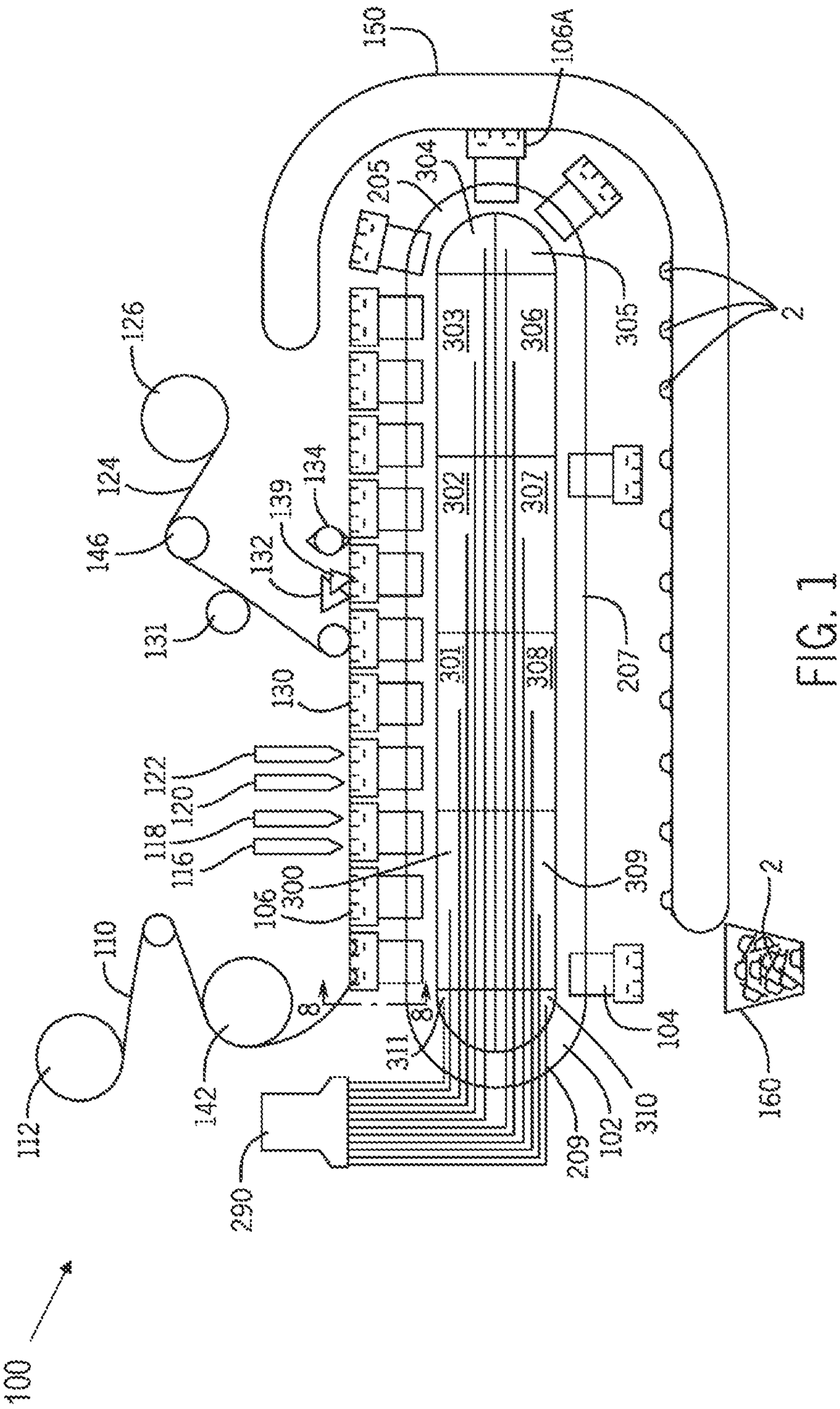
FIG. 1 is a schematic representation of the pouch packaging machine.
Figure 2:
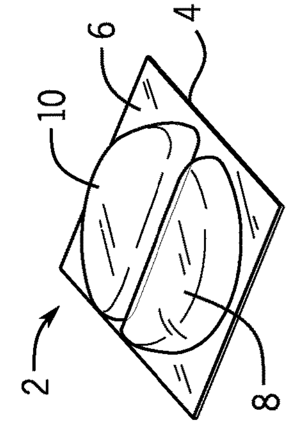
FIG. 2 is a perspective view of the pouch.

A pouch manufacturing machine 100, as shown in the drawings utilizing reference numbers, in various embodiments, addresses some or all of the limitations and disadvantages of the prior art, among other advantages. FIG. 1 is a schematic representation of the pouch packaging machine 100. One example of an end product of the machine 100 is a film wrapped pouch, illustrated as a double chemical pouch 2. Of course, the pouch packaging machine 100 may be used to manufacture a limitless variety of pouches with single, triple, or other multiple chambers with varying combinations of powder, liquids, and other fillers in varying shapes and designs. One specific application of the packaging machine 100 is for making a detergent pouch for use in washing machines, dishwashers and other cleaning applications, although the packaging machine 100 is not limited to such an application and alternative uses are clearly contemplated for other chemical and product compositions to be encased in a film wrapped pouch. Referring to FIG. 2, the double chemical pouch 2 comprises a base film 4 secured to a lid film 6 where between a powder cleaning agent chemical 8 and a liquid cleaning agent 10 are encased. Although the double chemical pouch 2 includes chemical cleaning agents, the pouch manufacturing machine 100 may be used to wrap food type products in food safe film. For example, the pouch manufacturing machine 100 may package powdered beverage flavorings or ingredients in food safe films.

The double chemical pouch 2 comprises two separate sealed chemicals 8, 10 separated by an intervening film wall. Detergent pouches are very common and many varieties have been created, including for use in dishwashers, washing machines, and other applications. The detergent pouches can include just powder detergent, just liquid detergent, color bleach, softener, and other chemicals, and they can be myriad different combinations in a single pouch, although the use of the single and multiple component pouches just not limited to detergent applications. The packaging machine 100 may be used to create film wrapped pouches for a variety of applications. The packaging machine 100 improves product speed while still providing a machine that is flexible and easily modified that it can produce a wide variety of single and multi-chemical pouches in a variety of shapes and sizes The pouch manufacturing machine 100 is schematically represented at FIG. 1, which creates single and multi-chemical pouches through a series of stages using several different pieces of equipment. As will be set forth in more detail herein, of the reasons the packaging machine 100 has advantages is because the creation of the pouches is performed utilizing a series of mechanically independent linear motors that propel movers carrying the pouches and the components that make up the pouches in an arrangement wherein the movers are not mechanically linked.

Figure 3:
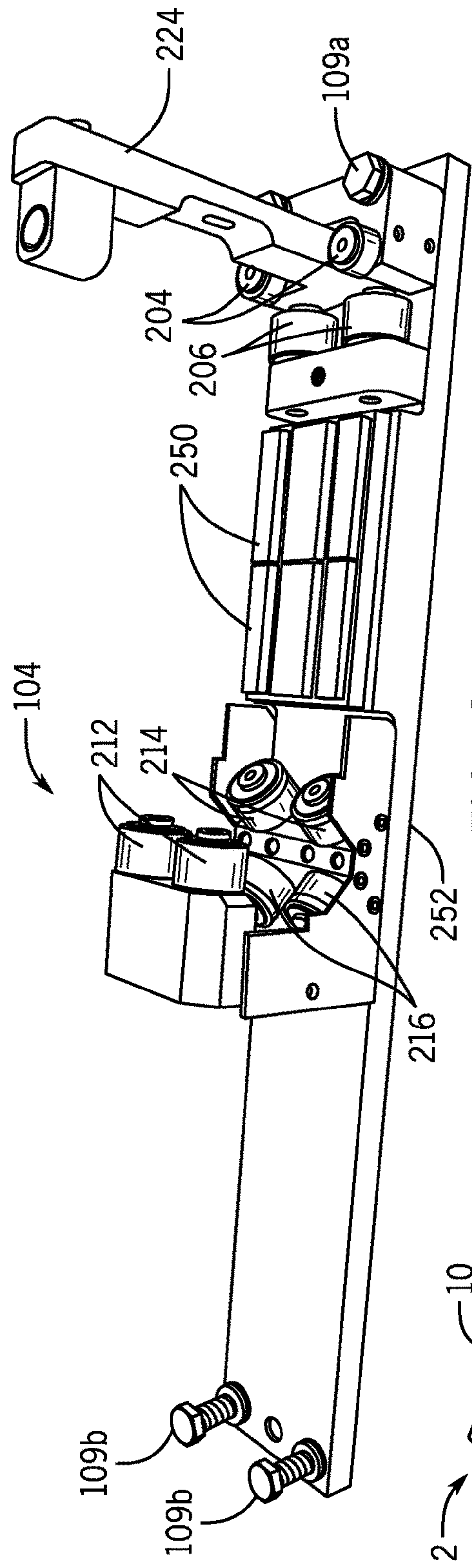
FIG. 3 is a perspective view of the mover showing the rollers and magnets.
Figure 4:
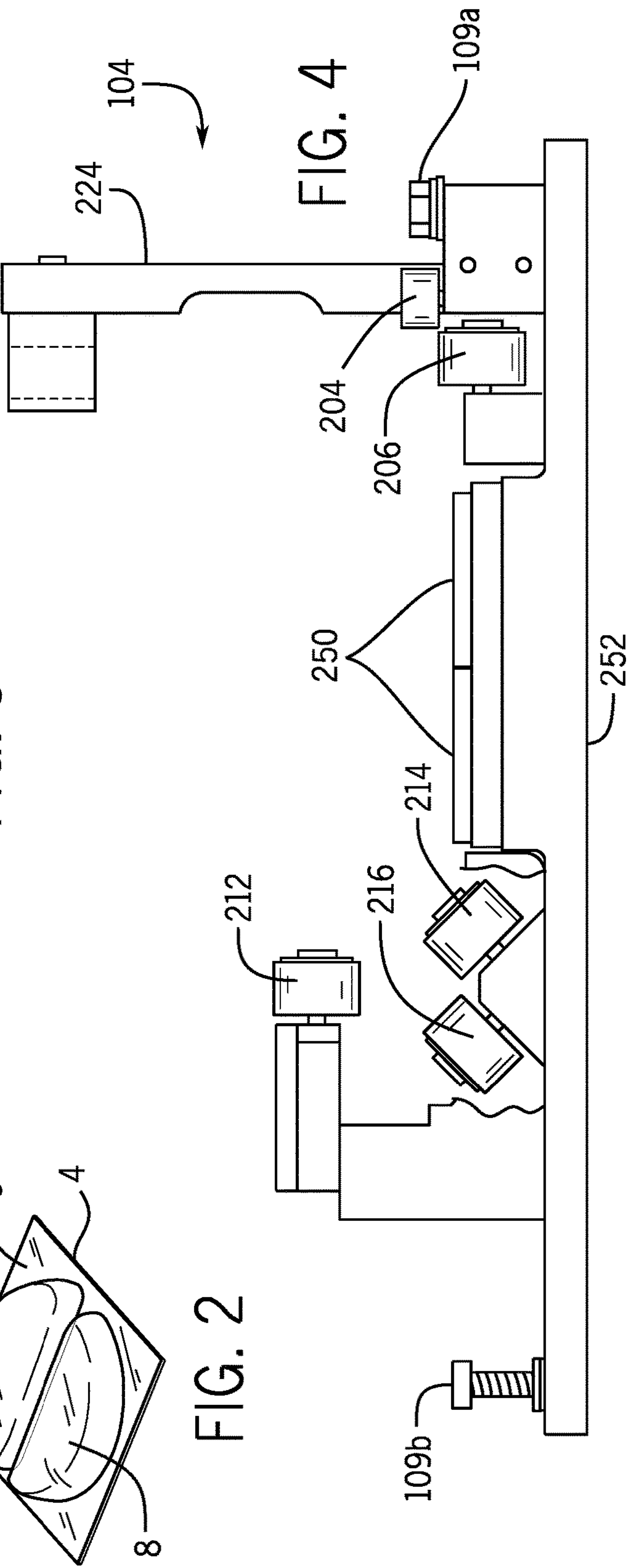
FIG. 4 is a front view of the mover showing the rollers and magnets.

The machine 100 includes a track 102. Movers 104 travel around the track 102 to the various stages of processing. The movers 104 are shown in FIGS. 3 and 4. The movers 104 travel relative to the track 102. As shown in FIG. 1, the track 102 is approximately in the shape of an oval with flattened upper and lower sides, although the track 102 may be provided in other shapes. For example, the track 102 may include a partial or semi oval shape. For example, the track 102 may include a triangular shape or other rectangular and curving shapes with curving corners. The track 102 may include a first portion wherein the movers 104 travel in an upward facing orientation and a second portion wherein the movers travel in a downward facing orientation.

Figure 5:
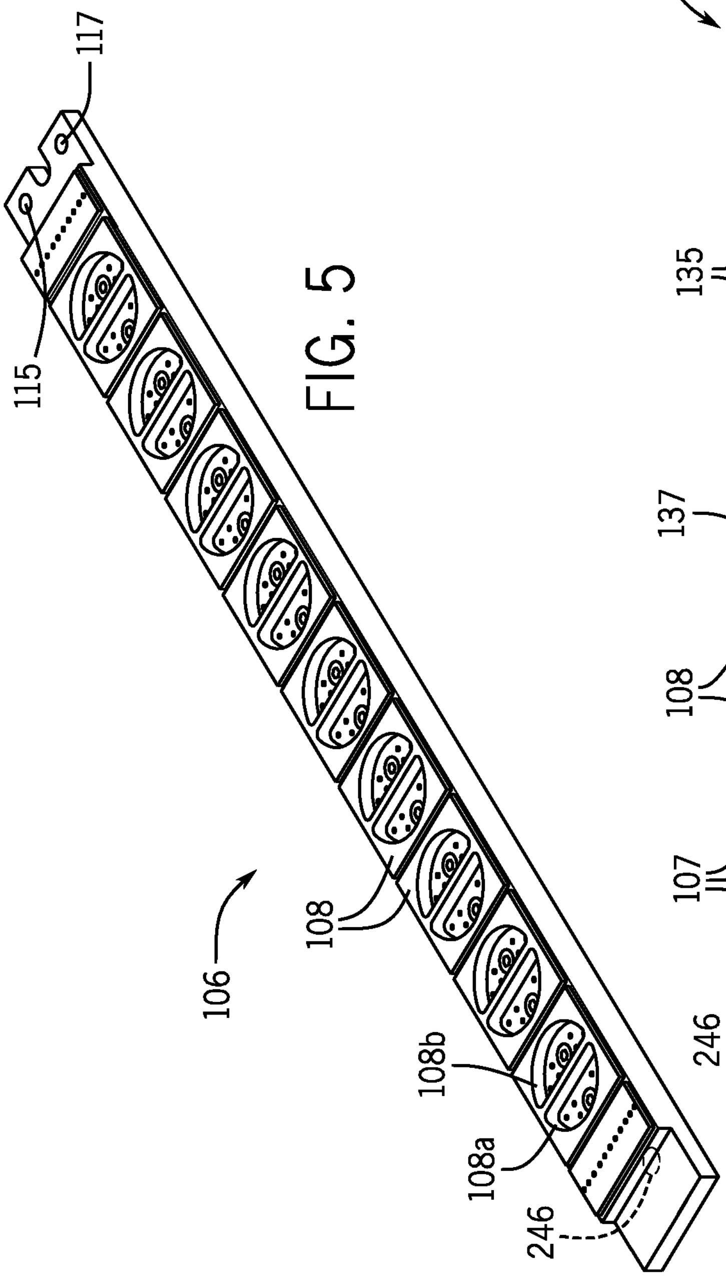
FIG. 5 is a perspective view of the platen showing the empty molds.
Figure 6:
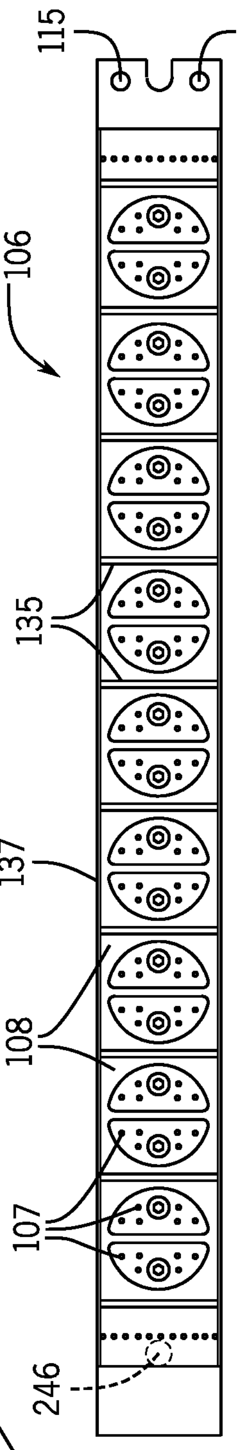
FIG. 6 is top view of the platen.
Figure 7:
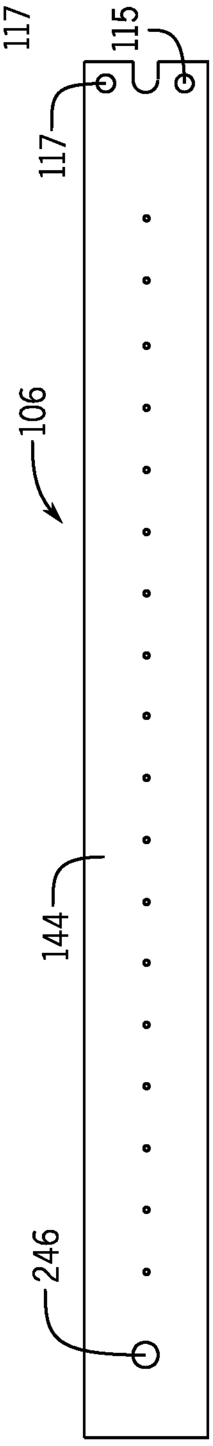
FIG. 7 is a bottom view of the platen.

An elongated platen 106 is secured to the mover 104 and moves in the same general path as the mover 104. The platen 106 is shown in FIGS. 5-7. The platen 106 is provided in a wide variety of sizes and arrangements to accommodate a variety of mold sizes and arrangements. For illustration purposes, one embodiment of the platen 106 is shown with a 1×9 arrangement of molds 108 in FIGS. 5-7. The platen 106 may be easily replaced with other platens, such as a platen having a 2×11 arrangement. The platen 106 has a single row of molds 108, as illustrated in FIGS. 5 and 6. The size or arrangement of molds 108 or platen 106 may be changed depending on the particular application and pouches being produced.

The platen 106 is shown secured to the mover 104 with two opposed bolts 109*a*, 109*b* extending through sleeves 111, 113 in the mover 104 to engage opposed threaded sleeves 115, 117 formed on the underside of the platen 106. A bottom surface 144 of the platen 106 rests on a top surface 252 of the mover 104. The platen 106 may be secured to the mover 104 in other manners, including the use of spring loaded clamps, mechanical connections, fasteners, and the like. The bolts 109*a*, 109*b* provide a quick and easy engagement for removably securing the platen 106 to the mover 104, allowing quick changeover to run different sizes and configurations of pouches by simply changing the platens 106. For example, the platen 106 may be replaced with other platens having two molds per row, different shaped molds, etc. Many other devices and platen arrangements for such quick changeover are contemplated so that the use of some other such quick change device does not depart from the principles of the present disclosure.

Figure 9:
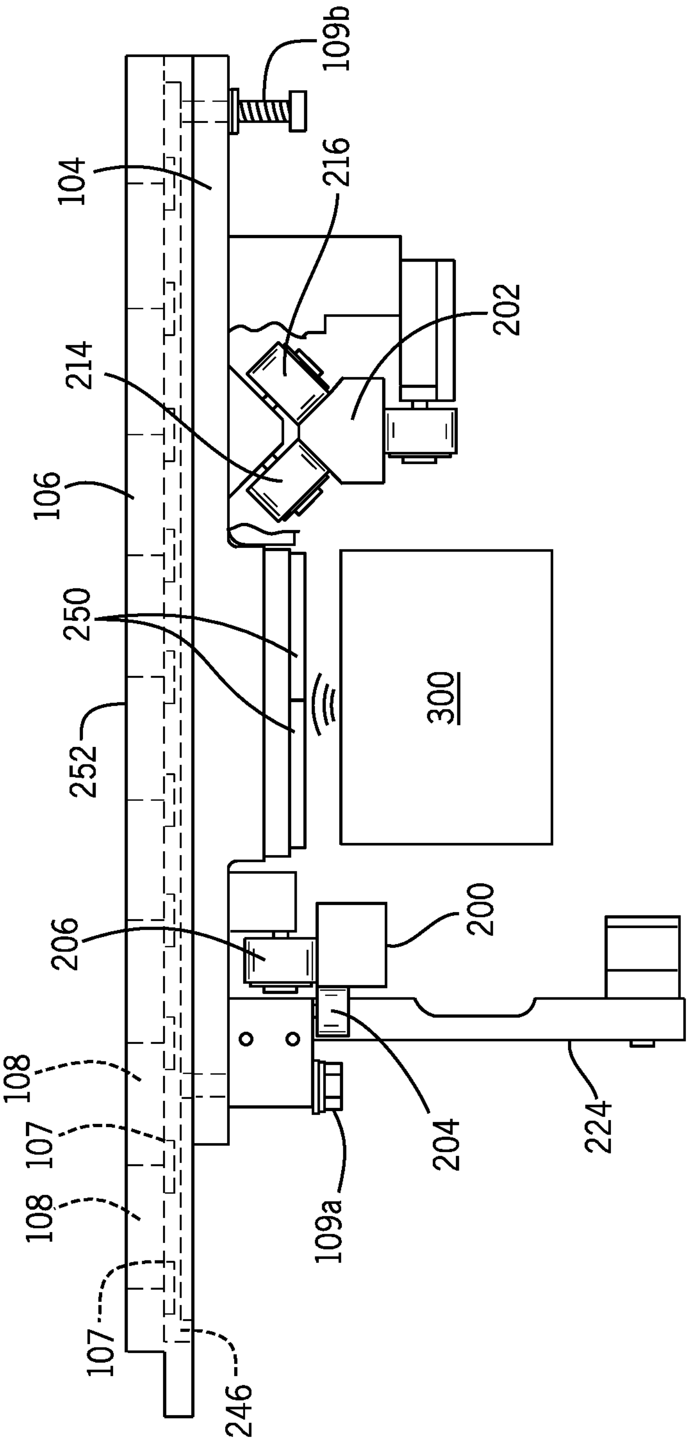
FIG. 9 is a front view of the mover with the platen affixed, illustrating the vacuum communication path between the through the mover to the molds in the platen.
Figure 10:
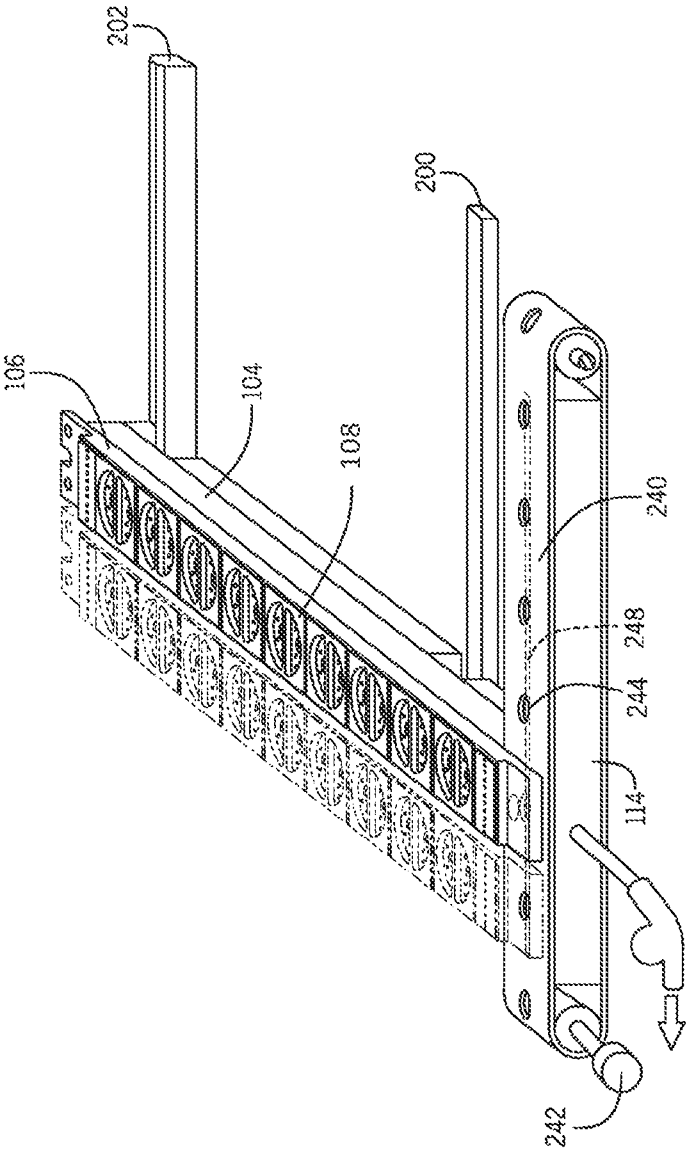
FIG. 10 is a schematic representation of the packaging machine illustrating the relative location of the plenum used to draw a vacuum.
Figure 11:
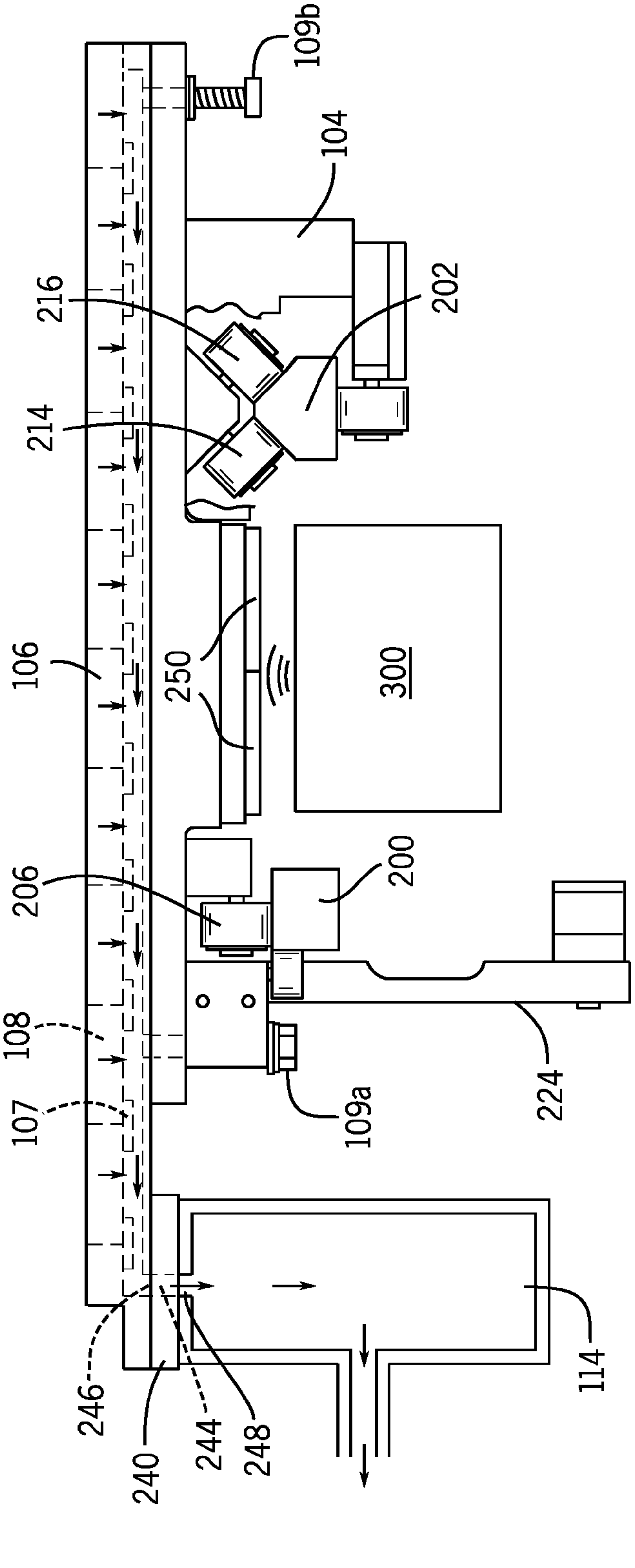
FIG. 11 is a perspective schematic representation of the platen to vacuum belt to plenum connection.

The pouches 2 are created when the platen 106 secured to the mover 104 travels around the track 102 going through a series of discrete operations and stages. First, the platen 106 has a layer of base film 110 laid over it, fed from a spool 112. From the spool 112, the base film 112 passes a heated roller 142. Then, the base film 110 is laid over the full length and width of the platen 106 so that it completely covers the entire arrangement of molds 108 of the platen 106. With reference to FIGS. 9-11, the platen 106 moves in a left to right direction until it comes into fluid communication with a vacuum plenum 114, which pulls a vacuum in the molds 108 at apertures 107 formed in the bottom of the molds 108. The vacuum created at the apertures 107 works to pull the base film 110 down into the molds 108, such that the base film 110 lines the inside of the molds 108.

Next, the platen 106 affixed to the mover 104 is propelled to the fill stage where the platen 106 is positioned under one or more fill heads, such as fill heads 116, 118, 120, 122. The platens 106 pass under the fill heads 116, 118, 120, 122 at such speed necessary to allow complete filling of the molds 108, lined by the base film 110. The platens 106 may be slowed sufficiently to use one fill head 116 for the illustrated platen 106, to use multiple fill heads per platen 106, to use multiple fill heads per mold 108, etc. The flexibility of the machine 100 to change the speed of the platen 106 through the fill stage and to add rows of fill heads is achieved because of the non-contact driven nature of the movers 104, and the variation in speed is possible because the platens 106 are mechanically independent from each other. The flexibility is further achieved as the platens 106 are quickly and easily changed to accommodate different pouch products, as set forth in more detail herein.

In addition, the fill heads 116, 118, 120, 122 may be provided with a wide array of chemicals. For the specific application of detergent pouches, the chemicals may include powder detergent, liquid detergent, color bleach, softener, or other chemical agent, and these chemicals may be directed into multiple component molds 108 with an intervening wall to create multi-component pouches. Other chemicals and products may be produced as film wrapped pouches, by changing the chemicals and fillers provided at fill heads 116, 118, 120, 122. To change products, either arrangement or size, fill heads 116, 118, 120, 122 may be removed, or additional fill heads added, in framework above the platens 106, thereby providing platens 106 with molds 108 of the proper structure to provide the necessary components, fill speed, and chemicals and by defining and re-defining the speed at which the platen 106 moves through the various stages, including the fill stage.

With reference to FIG. 1, after the molds 108, lined with base film 110, have been filled with the desired chemicals or products, the next stage encountered as the platen 106 moves in the direction shown is the application of a lid film 124. Similar to the base film 110, the lid film 124 is unwound from a spool 126, passes by a bow roller 146, and is laid over the filled molds 130. For water-soluble film applications, water or other solutions are applied to the lid film 124 prior to being draped over the platen 106 by a wetted roller 131. The lid film 124 is thereby bonded to the base film 110 around the perimeter of the filled molds 130 so that after application of the lid film 124 the chemicals in the molds 130 are completely encapsulated between the base film 110 and lid film 124.

After encapsulation of the chemicals or products occurs with the application of the lid film 124, the platen 106 continues to progress through the machine 100 to engage fixed knives 132 which slice the bonded base film 110/lid film 124 between the molds 108 in the direction of travel. The number and arrangement of fixed knives 132 are adjusted so that, as the platen 106 moves under the fixed knives 132, they cut the bonded lid film 124/base film 110 along the lines 135 parallel to the direction of travel. The arrangement of the fixed knives 132 may also include edge knives 139 that cut off side scrap on one or both sides in the event the bonded base film 110/lid film 124 extends beyond edges of the platen 106.

After the fixed knives 132 slice the bonded base film 110/lid film 124 longitudinally, a rotary cutoff knife 134, synchronized to the speed of the platen 106 such that a knife blade engages and cuts the bonded base film 110/lid film 124 between successive platens 106 along line 137 of FIG. 6 and between rows of molds 108 for a platen 106 having multiple rows formed therein. After the cutting by the fixed knives 132 and rotary cutoff knife 134, the pouches 2 remain retained in the molds 108 although they are not connected to each other.

The speed of the platen 106 is easily modified and changed, and they may be accelerated or decelerated. In a typical application of producing detergent pouches 2, the movement of the platens 106 is accelerated after the cutoff knife 134 cuts the base film 110/lid film 124 laterally. The speed of the platen 106 and the pitch between successive platens 106 changes when this acceleration occurs, which is only possible because the platens 106 are not mechanically linked and because the movers 104 are moved by a series of linear motors 300, 301, 302, 303, 304, 305, 306, 307, 308, 309, 310, 311 as set forth in more detail herein.

The speeds and accelerations of the platens 106 require fine tuning through the various stages of the machine and depend on a large number of factors such as, for example, the size of the molds 108, the number of rows on a platen 106, the identity and kind of chemical being provided at the fill stations 116, 118, 120, 122, the number of fill stations, the kind of pouch being produced, and many other considerations. It is desirable to drive the platens 106 through the form, fill, seal and cutting stations as quickly as possible while preventing any spillage of the chemicals, and while giving sufficient time to reliably seal the lid film 124 to the base film 110 and then cut it with fixed knives 132 and a rotary knife 134.

However, while the speed of the platens 106 through the form, fill, seal and cutting stations will be optimized, it is generally desirable to accelerate the movement of the platen 106 after processing through those stations to expel the pouches 2 from the molds 108 and to return the molds 108 back to the forming station as quickly as possible. The expulsion of the pouches 2 and return of the platens 106 may be solely and reliably performed at a generally much greater speed than the forming, filling, sealing and cutting stages, and the packaging machine allows acceleration of the platens 106 to a greater speed during expulsion and return. Similarly, as set forth in more detail herein, the platens 106 are decelerated to a slower speed as they return to the forming station. The platens 106 may accumulate just prior to the forming station.

After the platen 106 passes the rotary knife 134 and turns downward, and possibly during or before the cutting or the top lid formation, the vacuum applied under the molds 108 is disconnected as set forth in more detail herein so the pouches 2 are no longer retained in the molds 108 by the vacuum. After disconnection of the vacuum, the pouches 2 are held in the molds 108 (e.g. see platen 106A in FIG. 1) by contact with a separately driven exit conveyor 150 as the platen 106 turns downwardly until the exit conveyor 150 moves away from the platen 106, at which point the pouches 2 then fall freely out of the molds 108 and onto the exit conveyor 150. In other aspects, a blowback may be used to separate the pouches 2 from the molds 108. The pouches 2 are then transported and dumped into a collection bucket 160. The exit conveyor 150 is driven by a servomotor that matches the speed at which the movers 104 are driven as the pouches 2 are being dumped onto the exit conveyor 150. The pouches 2 are subsequently packaged in secondary packaging and distributed to consumer products retailers. As shown in FIG. 1, the track 102 turns downward and reverses direction, which orientates openings of the molds 108 in a downward direction to facilitate the release of the pouches 2 from the molds 108.

The foregoing description of a process and equipment, as illustrated in FIG. 1, reflect the multiple stages of processing a film wrapped pouch 2, or for example, without limitation, a single chemical detergent pouch or other multiple chemical detergent pouches. The process includes forming the pouch 2 from a base film 110, drawn down to line the interior of a mold 108, filling the lined mold 108 at a fill station with fill heads 116, 118, 120, 122, sealing with a lid film 124, cutting into individual pouches 2 with fixed knives 132 and rotary cutoff knife 134, and expelling the pouches 2 onto an exit conveyor 150. As set forth in more detail herein, the processes and equipment used to move the platen 106 through these stages distinguishes the packaging machine 100 from the prior art.

The packaging machine 100 has a fixed track 102, shown schematically as having a vertically oriented, approximately oval shape with flattened upper and lower sides at FIG. 1, around which the individual movers 104 travel. The pouches 2 are produced in molds 108 that are formed in the platens 106, which are secured to the movers 104, but there is no mechanical connection between the movers 104. Each platen 106 represents a separate processing surface having molds 108 formed thereon. As set forth below, the travel of each platen 106 through the machine 100 is a function of a series of linear motors 300, 301, 302, 303, 304, 305, 306, 307, 308, 309, 310, 311 that propel the movers 104 around the track 102, though the various stages. In other aspects, fewer or additional linear motors 300-311 may be utilized, depending on the size of the packaging machine 100, the power of the motors 300-311, the desired operating characteristics, etc.

The movers 104 are movably engaged to the track 102. The movers 104 move relative to the track 102. Bearings, rollers, wheels, slides, etc. are engaged to the track 102 and/or the movers 104 to assist in the movement of the movers 104 relative to the track 102. The linear motors 300, 301, 302, 303, 304, 305, 306, 307, 308, 309, 310, 311 drive the movement of the movers 104 relative to the track 102.

Figure 8:
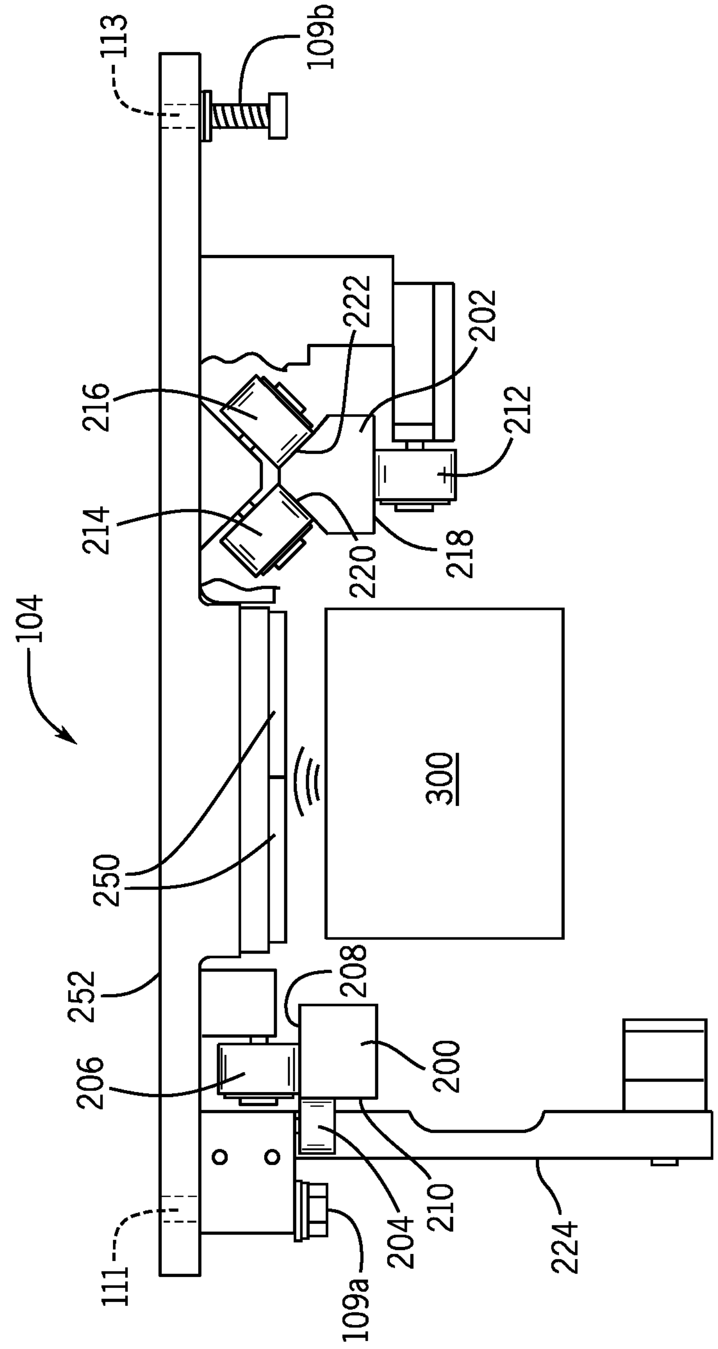
FIG. 8 is a schematic representation of the mover engaged to the track.

The creation of the pouch 2 begins with the application of the base film 110 in the mold 108, which takes place generally as a mover 104, with the platen 106 attached, is propelled along the track 102 by a linear motor 300 in the direction shown in FIG. 1. With reference to FIG. 8, a side view of the mover 104 and track 102 shows the general mechanical arrangement during propulsion around the track 102. In one example of the packaging machine 100, the track 102 comprises two opposed surfaces on which the mover 104 is propelled, a flat track 200 and a V-shaped track 202, each formed generally in the shape of the track 102 indicated at FIG. 1. The mover 104 is propelled along the flat track 200 with perpendicularly related rollers 204, 206 riding on a top side 208 and a lateral side 210 of the flat track 200. A support 224 is engaged on an outer side of the mover 104. The opposed side of the mover 104 is propelled along a V track 202, with three rollers 212, 214, 216 mounted on the mover 104 engaging an underside 218 and two sides 220, 222 of an inverted “V”, as shown in FIG. 8. The roller 212 engages to the underside 218 of the track 102, which helps to hold the mover 104 to the track 102. While the arrangement of the mover 104 with rollers 204, 206 and rollers 214, 216, 218 is shown on the flat track 200 and V track 202 near the application of base film 110, the mechanical relationship between the mover 104 and the track 102 is the same around the circuitous path of travel, the mover 104 following the terminating curved portion of the track 205 at which the pouches 102 are discharged, returning in an inverted orientation along the underside of the track 207, and then following the beginning curved portion 209 back to the beginning.

While the above description of the track 102 and mover 104 is set forth, other embodiments are contemplated for controlling the movement of a platen 106 through a circuitous path. Other configurations for the tracks and movers, wherein a mover for a pouch being processed is constrained to follow a path through the process defined by a track, are contemplated.

As described above, as the mover 104 and platen 106 move from the overlay of the base film 110 (forming) through the filling heads 116, 118, 120, 122 (filling), the sealing with the lid film 124 (sealing) and the cutting with the fixed knives 132 and the cutoff knife 134 (cutting), it is necessary to provide a vacuum under the platen 106 to draw down and hold down the base film 110 into the molds 108. This is accomplished by putting the platen 106 in communication with a vacuum plenum 114 having a motor and blower for evacuation of the vacuum plenum 114 which pulls a vacuum in vacuum plenum 114 (FIGS. 9-11). It is desirable to have the vacuum applied to the molds 108 through only a portion of the processing stages, and to have the vacuum disengaged for other stages. Specifically, the vacuum is applied as the platen 106 moves through the stages of forming, and filling, and also possibly through sealing and cutting of the pouch 2, and the vacuum is disengaged during expulsion of the pouch 2 from the mold 108 and as the platen 106 returns empty to the beginning forming stage.

Because the vacuum plenum 114 is not surrounded by or sealed off by an endless belt or housing such as those utilized in the prior art to restrict application of the vacuum to the platens from underneath, the packaging machine 100 provides an alternative arrangement. Engaging and disengaging the vacuum to each platen 106, when the platens 106 are not connected to each other, is difficult because access to the vacuum plenum 114 must be moving along with the platens 106. The engaging and disengaging of the vacuum to the mold 108 is accomplished by making and breaking the communication between the vacuum plenum 114 and the platen 106, while sealing such connection to the greatest extent possible, such that the vacuum is efficiently transmitted to the molds 108 to provide the necessary draw down for the base film 110.

In one aspect, the making and breaking of the communication between the vacuum plenum 114 and the platen 106 is provided by a driven vacuum belt 240 that travels around the perimeter of the vacuum plenum 114. With reference to FIG. 10, the vacuum plenum 114 is aligned parallel with the movement of platens 106. With continued reference to FIG. 10, the vacuum belt 240 is provided with vacuum belt port holes 244 that align with vacuum ports 246 on the underside of the platen 106 to apply the directional vacuum generated in the vacuum plenum 114 to the platen 106 and the molds 108. The vacuum ports 246 are located on the underside of the platen 106 at the ends of the platens 106. The ends of the platens 106 travel over an upper surface of the vacuum plenum 114, with the vacuum belt 240 between the upper surface of the vacuum plenum 114 and a lower surface of the ends of the platen 106. In the aspect shown, the ends of the platens 106 travel over all of or most of a length of the vacuum plenum 114. Limited moving access to the vacuum generated in the vacuum plenum 114 is provided by a slot 248 in the plenum, which aligns with the belt port holes 244. In the aspect shown, the slot 248 is in the upper surface of the vacuum plenum 114. The platen port holes 246 are synchronized by the central controller 290 to align with the belt port holes 244. The vacuum belt 240, driven by a servomotor 242 at the same speed as the platen 106 is being processed, is synchronized such that the belt port holes 244 align with the platen port holes 246 to put the platens 106, and the molds 108 thereon, in communication with the vacuum plenum 114, thereby applying the vacuum necessary for the drawdown of the base film 110 and for retention of the pouches 2 in the mold 108. The belt 240 does not drive the platens 106 or the movers 104, but instead the belt 240 provides a sealing function to maintain vacuum.

The vacuum connection to the platen 106 is broken when the belt port holes 244 have traveled beyond the end of the slot 248 and the vacuum belt 240 is no longer coincident with the slot 248 in the vacuum plenum 114. In this manner, the driven vacuum belt 240 makes and breaks a vacuum connection to the platen 106 and to the mold 108, by providing limited and synchronized sealed access to the vacuum generated by the vacuum plenum 114. By driving the belt 240 at the same speed as the platen 106, the drag and friction on the platen 106 is minimized such that the platen 106 moves easily through the machine propelled by linear motors as set forth in more detail herein. However, while this is one example for providing vacuum to the platen 106 and molds 108, other methods and devices are contemplated for making and breaking a temporary sealed vacuum connection to the platen 106.

Figure 12A:
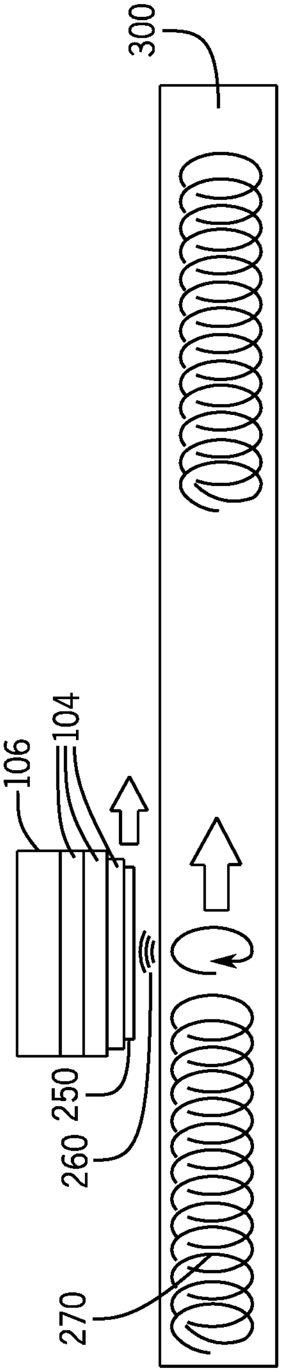
FIGS. 12*a*, 12*b* and 12*c* are schematic illustrations of the mover and platen following the magnetic field of the linear motor.
Figure 12B:
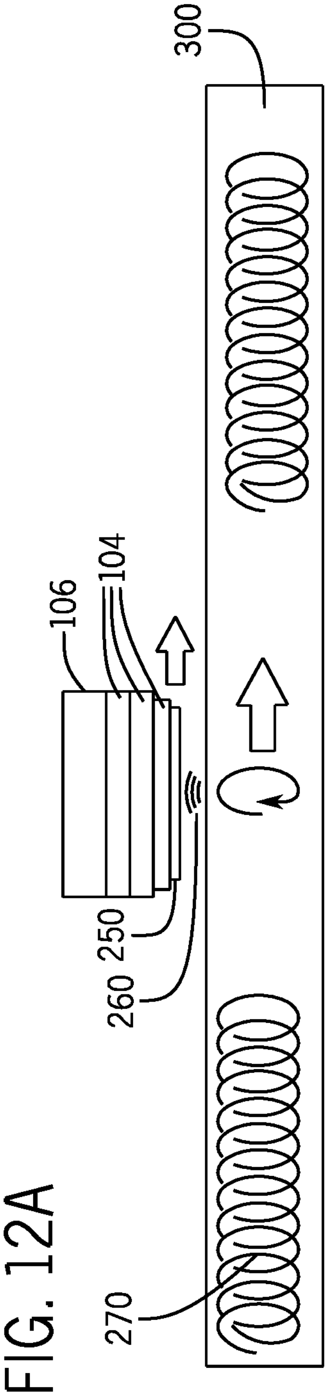
Figure 12C:
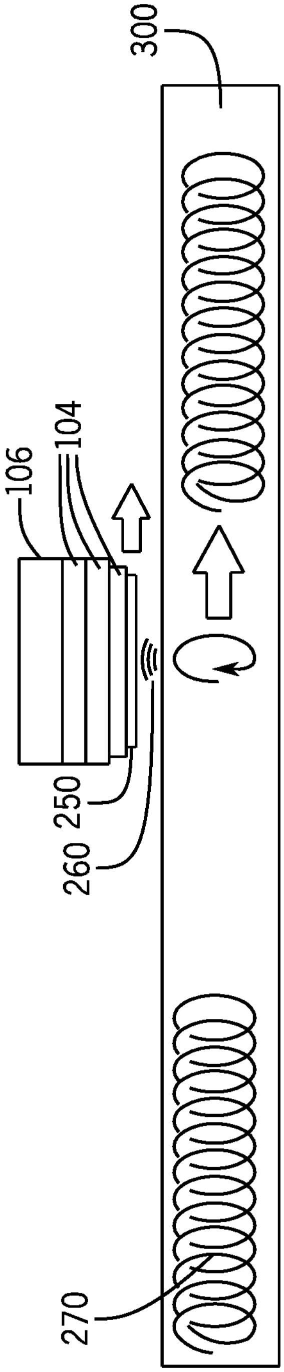

The mover 104, in addition to being provided with the mechanical engagement for following the track 102, is also provided with a magnet 250 which, along with linear motors 300, 301, 302, 303, 304, 305, 306, 307, 308, 309 310, 311 provides the force propelling the mover 104 around the track 102. The mover 104 is driven along the track 102, in the directions shown in FIG. 1, as a result of the magnet 250 following magnetic fields induced in each of the linear motors 300, 301, 302, 303, 304, 305, 306, 307, 308, 309 310, 311 as defined and controlled by a central controller 290. There is no physical contact between the magnet 250 and the linear motor 300, but instead a magnetic field 260 (schematically represented as propagating wave lines in FIGS. 12*a*, 12*b*, 12*c*) is created by the central controller 290 varying the electric current through a coil 270 that spans the length of the linear motor 300. The central controller 290 is programmed by the user to vary the current in the coil 270 to vary the speed at which the magnetic field 260 propagates in the direction shown in FIGS. 12*a*, 12*b*, 12*c*. The magnet 250, secured to a mover 104 located sufficiently near to the linear motor 300 to be within the range of the magnetic field 260, follows the magnetic field 260 as it propagates through the linear motor 300 as reflected in FIGS. 12*a*, 12*b*, 12*c*. Without any physical contact between the magnet 250 and linear motor 300, the motive force or propulsion for the mover 104 is provided as the magnet 250 follows the magnetic field 260 as it propagates.

Because the central controller 290 controls the speed, and the acceleration or deceleration characteristic of the magnetic field 260 through the linear motor 300, so too the speed and acceleration or deceleration of the mover 104 will be identically defined. Insofar as the central controller 290 is reprogrammable so that only software changes are required to modify the speed and acceleration or deceleration of the magnetic field 260, a user has a great deal of flexibility to modify the speed and acceleration or deceleration of a mover 104 that follows the magnetic field 260. In addition, because the packaging machine 100 comprises linear motors 300, 301, 302, 303, 304, 305, 306, 307, 308, 309 310, 311, and the speed and acceleration or deceleration can be controlled for each of the linear motors 300, 301, 302, 303, 304, 305, 306, 307, 308, 309 310, 311 by the central controller 290 without affecting the speed and acceleration or deceleration in the others, the machine 100 is quickly and easily modified and adjusted to provide for longer or shorter periods of time in any stage of processing without greatly affecting the overall cycle time of the process. The linear motors 300, 301, 302, 303, 304, 305, 306, 307, 308, 309, 310, 311 provide great flexibility to speed up or slow down, or even bring to a complete stop, the movers 104 upon which the platens 106 travel. The movers 104 can be completely stopped, for example, under the filling heads 116, 118, 120, 122 while empty platens 106 are rapidly being returned to the fill stations after expulsion of the pouches 2 therefrom. The speed, acceleration and deceleration in one portion of the machine 100 driven by one linear motor is completely independent of the speed, acceleration and deceleration in another portion of the machine 100 driven by another linear motor. The packaging machine 100 may be operated wherein the movers are started, stopped, accelerated and decelerated as a run/dwell type machine in certain portions while continuously running at high speeds in other portions. While the linear motors 300, 301, 302, 303, 304, 305, 306, 307, 308, 309, 310, 311 are used with the packaging machine 100, fewer or additional linear motors may be used with the packaging machine 100.

The linear motors 300, 301, 302, 303, 304, 305, 306, 307, 308, 309 310, 311 provide a non-contact means for propelling the mover 104 around the track 102, at a speed and with an acceleration or deceleration characteristic that is defined independently in each stage by a linear motor 300, 301, 302, 303, 304, 305, 306, 307, 308, 309 310, 311. The central controller 290 defines the speed and acceleration or deceleration characteristic for each linear motor 300, 301, 302, 303, 304, 305, 306, 307, 308, 309 310, 311, and may be easily modified with software to modify them. Each mover 104 travels mechanically independently of other movers 104 around the track 102, following the magnetic field propagating through the linear motors 300, 301, 302, 303, 304, 305, 306, 307, 308, 309 310, 311. The central controller 290 is programmed to provide for transfer or handing off of the mover 104 from one linear motor to the next such that each mover travels smoothly around the track 102, decelerating as necessary to allow controlled reliable processing in certain stages and accelerating in the stages, where possible, to minimize overall cycle time for the machine 100.

The linear motors 300, 301, 302, 303, 304, 305, 306, 307, 308, 309 310, 311, controlled by central controller 290, provide a flexible and easily modified way to propel the movers 104 through the machine 100. The capability to change speeds and acceleration and deceleration characteristics in very small portions of the overall path of travel allows fine adjustment of the process to provide controlled, reliable processing while minimizing the risk of spillage or other error. That is, for example, the speed in the fill section only can be slowed down without affecting the speed with which the platen 106 is returned empty to the form stage. This is a departure from the prior art, wherein a single continuous moving surface travelled at the same speed throughout the entire process.

In addition, the use of modular linear motors 300, 301, 302, 303, 304, 305, 306, 307, 308, 309 310, 311 with a central controller 290 allows the addition or removal of equipment, such as, for example, more fill heads allowing the production of different sized pouches or pouches having more separate chemicals therein. Additional linear motors are readily added, or deleted, from the machine 100 without great mechanical difficulty.

The simple connection of the platen 106 to the mover 104, using two opposed bolts 109 allows the machine 100 to be quickly changed over to produce pouches of different characteristics, size and chemical composition, with any necessary changes to processing speed in the individual linear motors 300, 301, 302, 303, 304, 305, 306, 307, 308, 309 310, 311 easily implemented in software changes by the central controller 290.

The movers 104 remain in place, and the speed and acceleration and deceleration characteristics of their movement around the track 102 can be defined and redefined as necessary. To maximize flexibility of the machine 100, it is desirable that the platens 106 are affixed to the movers 104 as simply as possible, through any of a vast number of spring loaded clamps, threaded bolts, locking set screws, or many other quick and easy means for engagement and disengagement. The platens 106 are secured to the movers 104 with bolts 115, 117 which, even in machines having many movers 104 will require only a matter of minutes for complete changeover of the machine 100.

Figure 13:
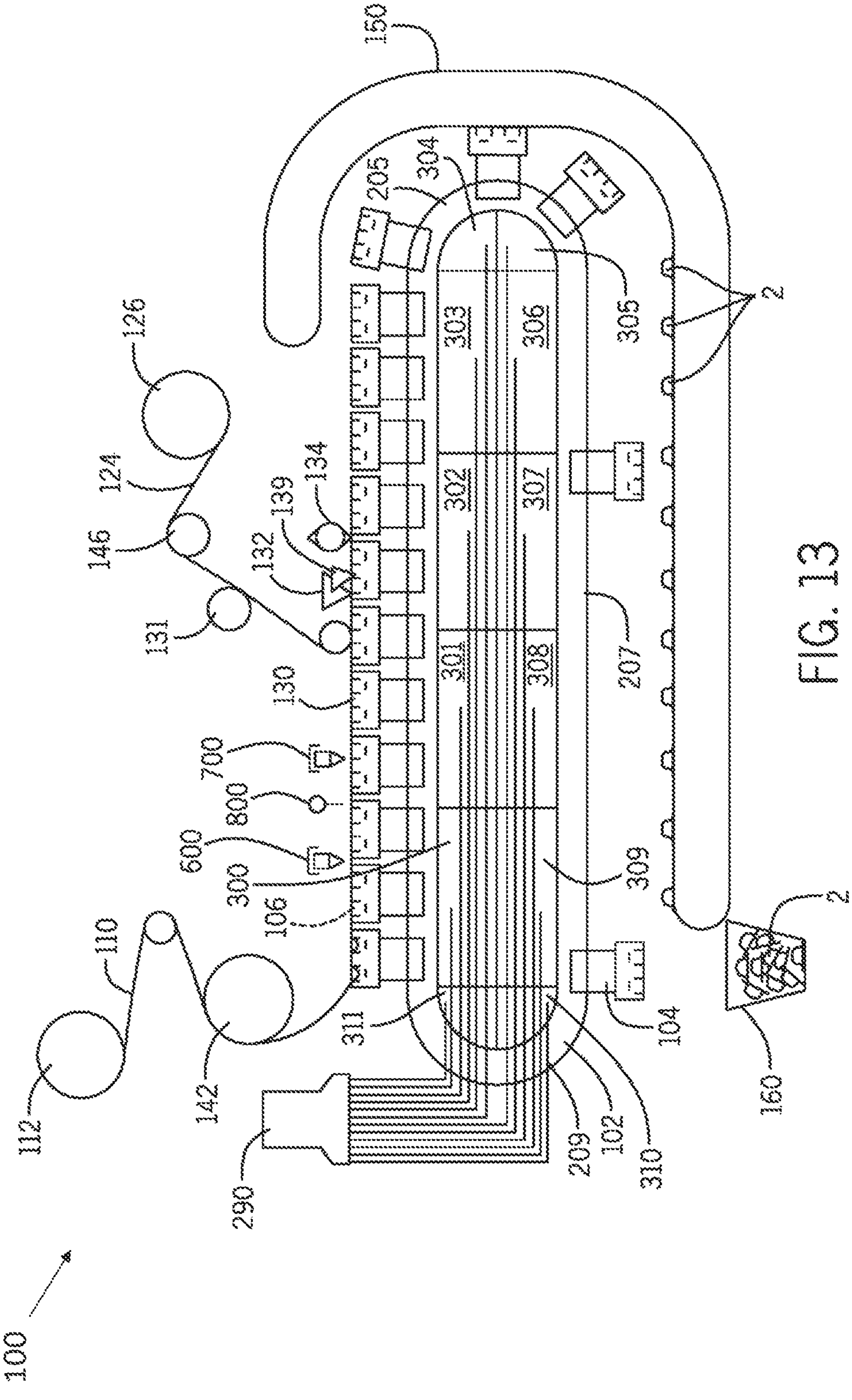
FIG. 13 is a schematic representation of the pouch packaging machine with the vacuum system and the moving filling systems.
Figure 14:
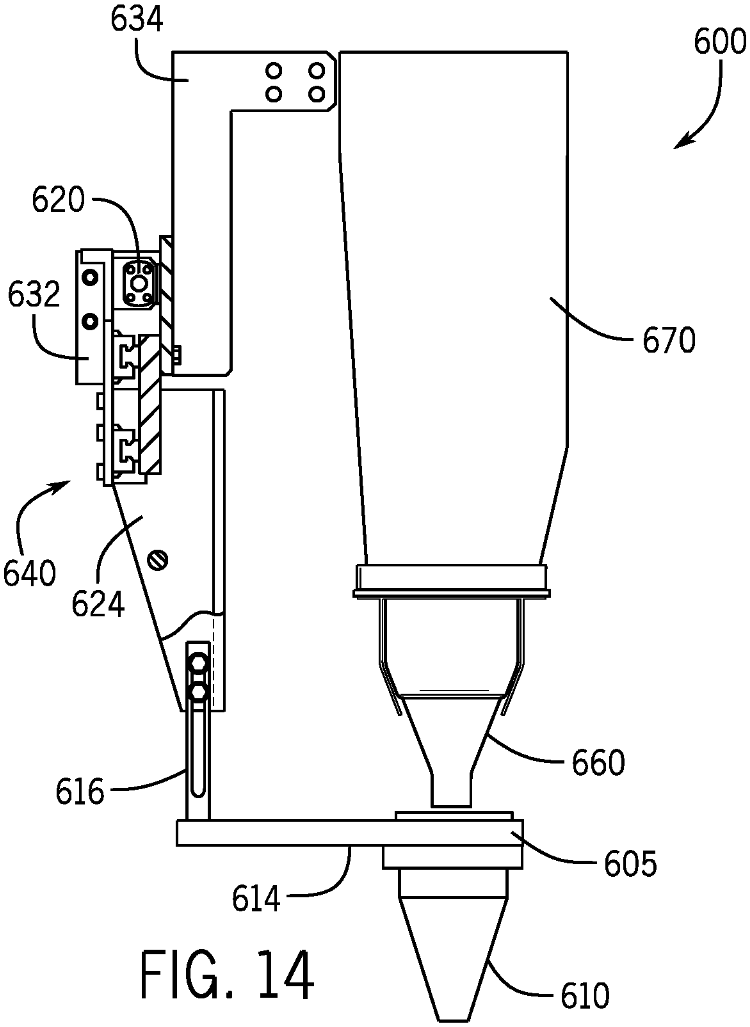
FIG. 14 is a side view of the first moving filler system.
Figure 15:
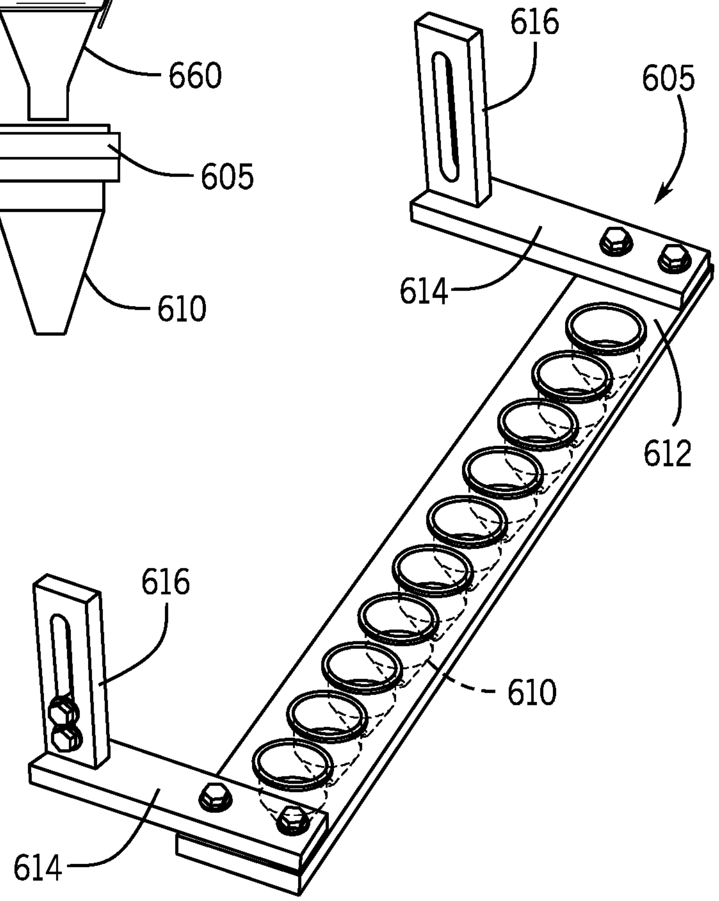
FIG. 15 is a perspective view of the filler housing.
Figure 16:
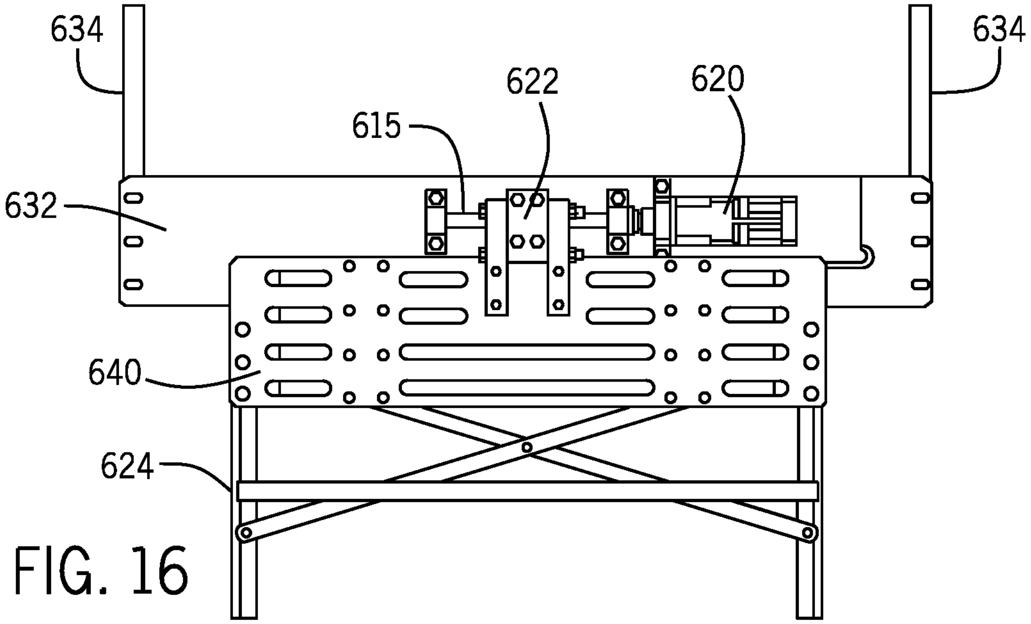
FIG. 16 is a front view of the filler housing support.

FIG. 13 is a schematic representation of the pouch packaging machine 100 incorporating a first moving filling system 600, a second moving filling system 700, and a vacuum assembly 800. The pouch packaging machine 100 may optionally include any or all of these subsystems. Further, the first moving filling system 600, the second moving filling system 700, and the vacuum assembly 800 may be incorporated into other conventional pouch packaging machines, such as a flatbed machines. The first moving filling system 600 and the second moving filling system 700 may replace or be used in conjunction with any or all of the fill stations 116, 118, 120, and 122.

With reference to FIGS. 14-18, the system 100 may include a first moving filling system 600 that fills the molds 108 of the platens 106 with a detergent, such as a powder detergent. The first moving filling system 600 may be incorporated into other packaging forming equipment, such as a flatbed machines.

The first moving filling system 600 moves a filling housing 605 generally perpendicularly to the movement of the platens 106 while filling the molds 108 of the platens 106 with the powder detergent. The movement of the first filling system 600 aids in evenly filling the molds 108 with the powder and promotes the filling of corners of the molds 108 with the powder detergent.

The filling housing 605 is positioned above the platens 106. The filling housing 605 includes an array of filling spouts 610 that deposits the powder detergent into the molds 108. In one aspect, the platens 106 are moving in a left to right direction. The filling housing 605 moves front to back over the platens 106 while filling the molds 108 of the moving platens 106. Next, the filling housing 605 moves back to front while filling the molds 108 of the next moving platen 106. Next, the filling housing 605 moves front to back, again, while filling the molds 108 of a subsequent moving platen 106. This pattern may be repeated for successive platens 106.

The filling housing 605 includes the filling spouts 610 spaced along a cross member 612. The cross member 612 is of sufficient length to pass over the width of the platen 106. The filling spouts 610 are generally spaced along the length of the cross member 612 to position one filling spout 610 per mold 108 or mold section. A pair of lateral supports 614 engage to opposite ends of the cross member 612. A pair of vertical supports 616 engage to the lateral supports 614, which engage to a filling housing support 640 that moves relative to the packaging machine 100. The filling housing support 640 holds and moves the filling housing 605.

In the aspect shown in FIGS. 14-18, a drive shaft 615 provides for the filling housing 605 to move generally perpendicularly to the movement of the platens 106. In the aspect shown in FIGS. 14-18, the drive shaft 615 is mounted generally perpendicular to the moving direction of the platens 106. The drive shaft 615 is rotated forward and reverse by a drive motor 620, which results in the forward and back movement of the filling housing 605, which is generally perpendicular to the left to right movement of the platens 106. In the aspect shown, the drive shaft 615 is a worm gear that threadingly engages a threaded opening 622 of the filling housing support 640. The filling housing support 640 is moved by the drive shaft 615. The filling housing support 640 includes lateral structures 624 that engage with the vertical supports 616 of the filling housing 605.

A support member 632 holds the drive shaft 615 and the drive motor 620. The support member 632 is attached to the framework of the packaging machine 100. Upper supports 634 may also engage to the framework of the packaging machine 100 to further support the first moving filling system 600 and to reduce vibration. Other shafts and structures may also support the filling housing 605 in the sliding engagement.

The filling housing 605 may be positioned below powder spout 660 to receive powder from the powder spout 660, which are supplied by a powder hopper 670. The powder spout 660 and the powder hoppers 670 remain stationary, while the filling housing 605 moves. The filling housing 605 may have an open top 650 to receive powder detergent from the powder spouts 660. The open top 650 leads to the array of filling spouts 610. The filling housing 605 may include a filling spout 610 for each mold 108.

Figure 17:
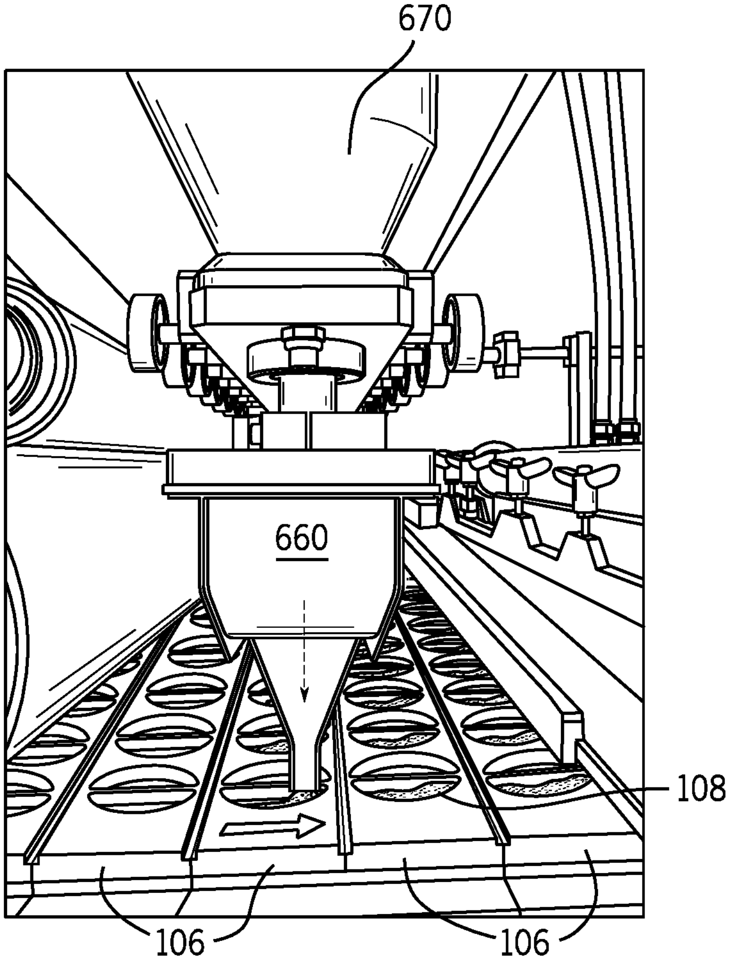
FIG. 17 is a perspective view of the powder spout and powder hopper.
Figure 18:
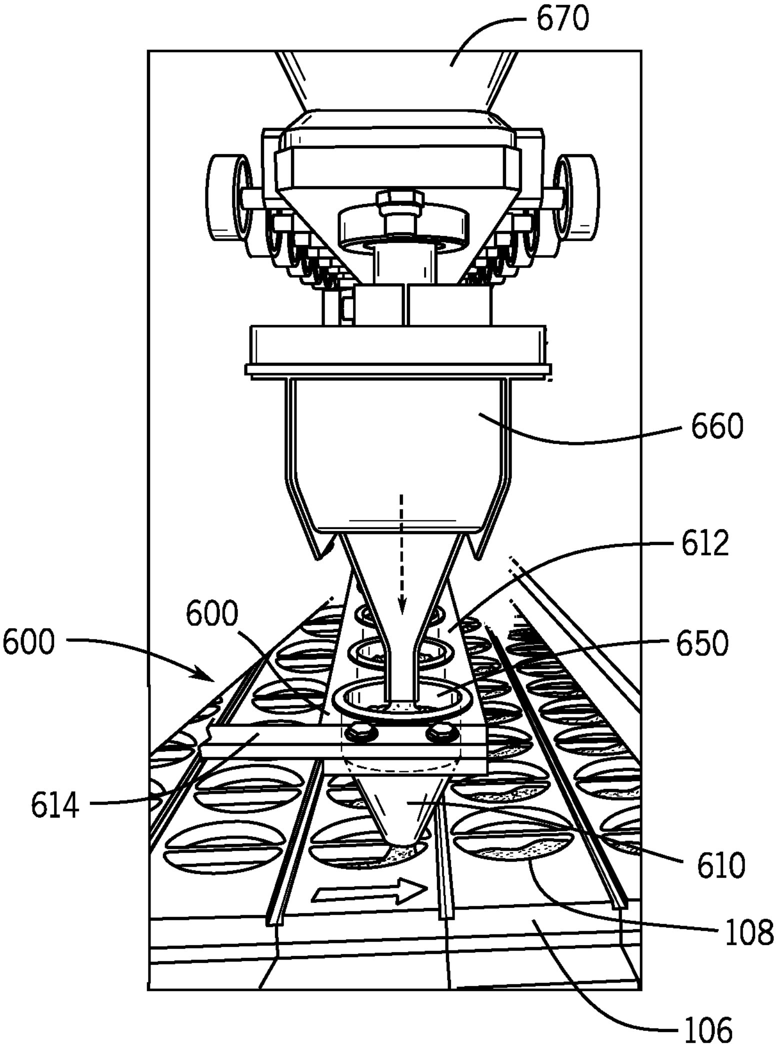
FIG. 18 is a perspective view of the moving filler system installed under the power spout and over the platens.

FIG. 17 shows the powder spout 660 and the powder hopper 670 prior to installation of the first moving filling system 600. FIG. 18 shows the first moving filling system 600 installed with the filling housing 605 receiving the powder directly from the powder spout 660. The powder spout 660 and the powder hoppers 670 are raised in FIG. 18 to accommodate the filling housing 605.

The rotation of the drive shaft 615 drives the filling housing 605 in movements generally perpendicular to the movement of the platens 106. The filling housing 605 reciprocates above the moving platen 106. This generally perpendicular movement assists in filling the molds 108, as the powder detergent is deposited in multiple directions in the molds 108, which helps to move the powder detergent into the corners of the molds 108. This promotes even and uniform filling of the molds 108. The speed that the first moving filling system 600 moves the filling housing 605 may be accelerated or decelerated depending on the processing conditions. Similarly, the pattern of movement for the filling housing 605 may programmed differently depending on the processing conditions.

Figure 19:
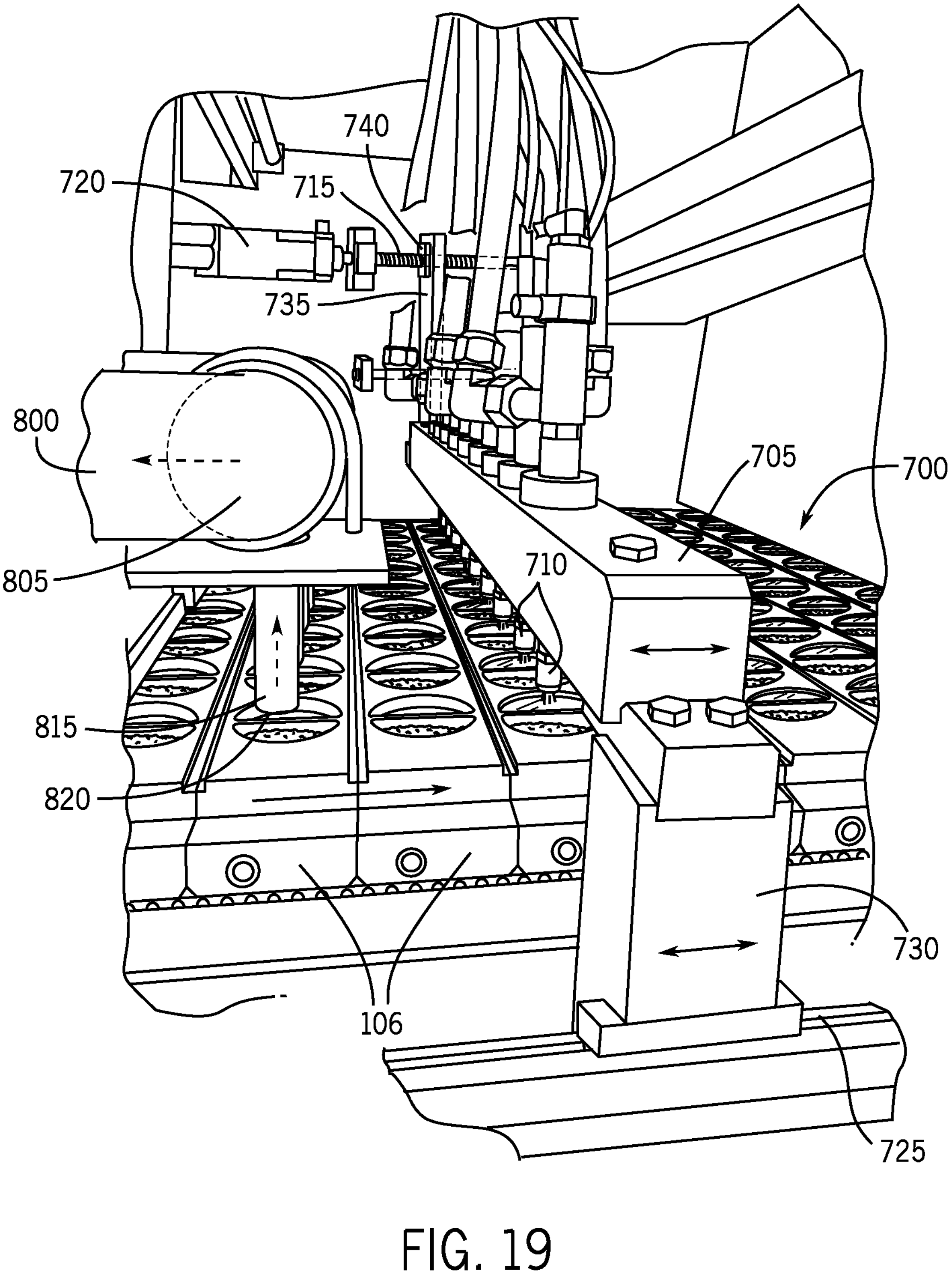
FIG. 19 is a perspective view of the vacuum system and the second moving filler system.
Figure 20:
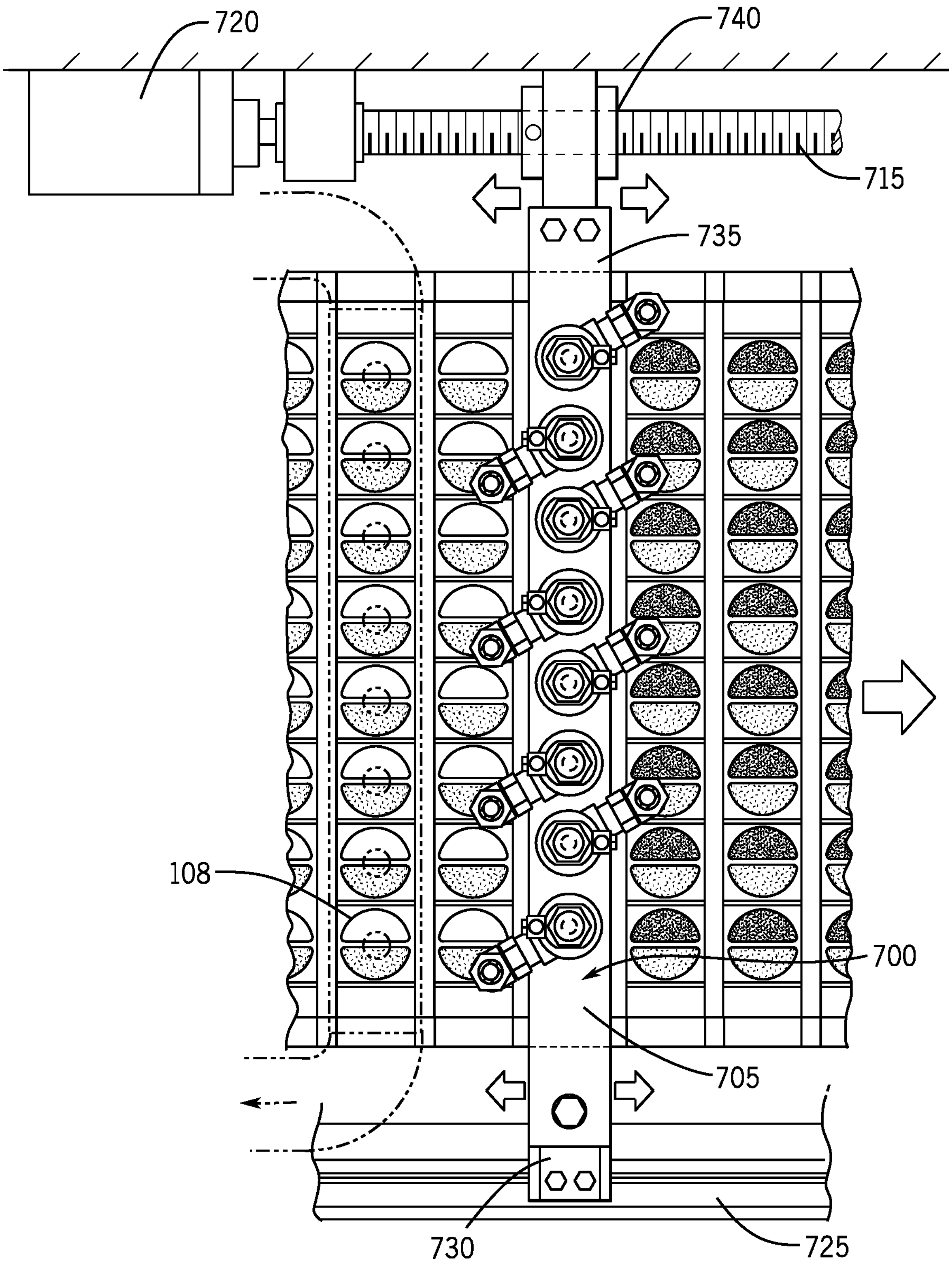
FIG. 20 is a top down view of the second moving filler system.

With reference to FIGS. 19 and 20, the system 100 may include a second moving filling system 700 that moves with and fills the platens 106 with a detergent, such as a liquid detergent. The second moving filling system 700 may be incorporated into other packaging forming equipment, such as a flatbed machines.

The second moving filling system 700 includes a cross-member 705 that crosses over a top of the platens 106. The cross-member 705 positions an array of filling nozzles 710. The cross member 705 and the filling nozzles 710 move generally parallel to the movement of the platens 106. The second moving filling system 700 positions one of the filling nozzles 710 directly over the mold 108 or over one of its depressions. Typically, the moving filling system 700 will include a filling nozzle 710 for each mold. The second moving filling system 700 moves the filling nozzles 710 with the molds 108. The second moving filling system 700 moves the entire array of filling nozzles 710 with the molds 108 in the same and opposite directions as the movement of the platens 106. The central controller 290 directs the movement of the second moving filling system 700. The filling nozzles 710 may travel faster, slower, or at the same speed of the molds 108. In general, the filling nozzles 710 move faster than the platens 106 in order to efficiently deposit the requisite amount of liquid detergent into the molds 108.

In the aspect of FIGS. 19 and 20, a drive shaft 715 moves the cross member 705. The drive shaft 715 is rotated in forward and reverse directions by a drive motor 720. The drive shaft 715 is positioned parallel to the moving direction of the platens 106. In the aspect shown, the platens 106 are moving left to right, and the moving filling system 700 also moves left to right. The cross member 705 is in a moving engagement with a front track 725 of the system 100. A front member 730 fixedly engages with and supports the cross member 705. The front member 730 movingly engages to the front track 725 via slides, bearings, wheels, etc. A rear member 735 fixedly engages with the cross member 705, and the rear member 735 movingly engages to the drive shaft 715. In the aspect shown, the drive shaft 715 is a worm gear that threadingly engages a threaded opening 740 of the rear member 735. The rotation of the drive shaft 715 drives the cross member 705 in a first direction, such as forward, and the opposite rotation of the drive shaft 715 drives the cross member 705 is a second direction, such as reverse.

The filling nozzles 710 are in fluidic communication with a liquid detergent reservoir via fluid lines that supply the fillings nozzles 710 with the liquid detergent. The second moving filling system 700 assists in improving efficiency of the system. The platens 106 may be moved faster during the production process, compared to other systems, as the filling nozzles 710 of the second moving filling system 700 are simultaneously moving with and filling the platens 106. In certain aspects, the filling nozzles 710 travel faster than the platens 106, since the filling nozzles 710 travel one direction while filling the molds 108 of one platen 106, then the filling nozzles 710 travel in the opposite direction to get back into its start position to fill the next mold 108 of the next platen 106. As shown in FIGS. 19-20, the filling nozzles 710 move left to right while filling the molds 108 of one platen 106, then move right to left without dispensing, and then move left to right to fill the molds 108 of the next platen 106. This pattern may be repeated for successive platens 106. The speed that the second moving filling system 700 moves the filling nozzles 710 may be accelerated or decelerated depending on the processing conditions. Similarly, the pattern of movement for the filling nozzles 710 may programmed differently depending on the processing conditions.

In other aspects, multiple second moving filling systems 700 may be employed over the platens 106. For example, one, two, three, or four or more second moving filling systems 700 may each contain different colors of liquid detergent for different sections of the molds 108. In other aspects, for example, multiple second moving filling systems 700 may include the same liquid detergent, and the multiple second moving filling systems 700 may apply the same liquid detergent to the same or different portions of the molds 108. Multiple second moving filling systems 700 that are each serially filling the same mold 108 may provide increased production rates.

In other aspects, the second moving filling systems 700 may connect or attach to the packaging machine 100 from upper framework or supports of the packaging machine 100. In such aspects, the array of filling nozzles 710 may extend downward from the upper framework or supports.

With reference to FIG. 19, the system 100 may include a vacuum assembly 800. The vacuum assembly 800 includes a manifold 805 in communication with one or more vacuum systems 810 to provide suction to the manifold 805. A first vacuum system may be placed in front of the track 100 and a second vacuum system may be placed at the rear of the track 102. The manifold 805 may cross-over a width of the platens 106. One or more vacuum nozzles 815 are in communication with the manifold 805. The vacuum nozzles 815 include vacuum openings 820 to draw in stray or unwanted powder. The vacuum nozzles 815 may be positioned directly over the molds 108 to remove the unwanted powder from the molds 108. The one or more vacuum nozzles 815 may descend vertically from the manifold 805 that is crossing over a top of the platens 106. The vacuum assembly 800 may include a separate vacuum nozzle 815 for each mold 108.

The vacuum assembly 800 is helpful when producing the pouch 2 having a liquid side and a powder side. In certain aspects, the mold 108 may include multiple depressions. For example, with reference to FIG. 5, the mold 108 includes a depression 108A which receives a powder detergent and a depression 108B—which receives a liquid detergent. The depressions 108A and 108B may be immediately adjacent to teach other. During the forming process, the powder detergent is first deposited into depression 108A, and then the liquid detergent is deposited into the depression 108B. During the filling process of the depression 108A with the powder detergent, however, an amount of stray or unwanted detergent powder may drift, spill into, or otherwise blow over into the depression 108B. This unwanted powder could discolor or otherwise degrade the appearance of the liquid detergent that is to be filled into the depression 108B. As such, the vacuum assembly 800 cleans the depression 108B before the depression 108B is filled with liquid detergent. For example, the manifold 805 is positioned above the platens 106 between the first moving filling system 600 and the second moving filler system 700. The first moving filling system 600 deposits the powder detergent into the depression 108A of the mold 108. The mold 108 is then moved under the vacuum openings 820 with the depression 108B moving directly under the vacuum openings 820 to vacuum out any stray powder detergent particles that may have ended up in the depression 108B. Next, the depression 108B is filled by the liquid filler of the second moving filling system 700. As such, the vacuum assembly 800 cleans the depression 108B immediately prior to filling the depression 108B with the liquid.

The vacuum assembly 800 may installed on packaging machines with non-moving filling systems, such as illustrated in FIG. 1 or in other conventional flatbed machines.

The foregoing description of exemplary embodiments of the packaging machine and its systems has been presented for purposes of illustration and description. It is not intended to be exhaustive or to limit the packaging machine or its systems to the precise form disclosed. Obvious modifications or variations are possible in light of the above teachings. It is intended that the scope of the invention be defined by the claims appended hereto.

What is claimed:

1. A packaging machine for making film wrapped pouches, comprising:

multiple stages for making film wrapped pouches on platens;

a track through the multiple stages;

movers carrying the platens through the multiple stages around the track; and, the movers move independently about the track through each of the multiple stages in an upward facing orientation in a first portion of the track and in a downward facing orientation in a second portion of the track; and a vacuum system, wherein the vacuum system comprises a vacuum manifold with vacuum nozzles positioned over the platens and the vacuum system is positioned between a powder fill head and a liquid fill head, wherein the platen moves under the powder fill head, then under the vacuum nozzle, and then under the liquid fill head.

2. The packaging machine as set forth in claim 1, wherein the movers are processed in a first stage with a first speed and acceleration characteristic and in a second stage at a second speed and acceleration characteristic, the first and second speed and acceleration characteristics being independently controlled.

3. The packaging machine as set forth in claim 2, wherein the movers are driven through the multiple stages by multiple mechanically independent linear motors.

4. The packaging machine as set forth in claim 3, wherein the movers are provided with magnets affixed thereto and propelled through the multiple stages by magnetic fields provided by the linear motors.

5. The packaging machine as set forth in claim 4, wherein there is no mechanical contact between the magnets and the linear motors.

6. The packaging machine as set forth in claim 5, wherein the movers are accelerated and decelerated through the multiple stages independently in each of the multiple stages.

7. The packaging machine as set forth in claim 6, wherein the movers are simultaneously propelled at a first speed in a first relatively slow stage of processing and propelled at a second speed in a relatively fast stage of processing.

8. The packaging machine as set forth in claim 1, further comprising a vacuum plenum, and a vacuum belt comprising a plurality of vacuum port holes that align with an opening of each platen to put the platens in communication with the vacuum plenum to provide a vacuum force to molds in the platens, wherein the vacuum belt does not drive the platens or the movers.

9. The packaging machine as set forth in claim 1, wherein the multiple stages comprise a fill stage and wherein a first platen is propelled slowly through the fill stage while other platens are being moved at higher speeds in other of the multiple stages.

10. The packaging machine as set forth in claim 1, wherein the movers arc mechanically independent.

11. The packaging machine as set forth in claim 10, wherein the movers are propelled by following magnetic fields created by a series of linear motors, the movers having magnets that follow the magnetic fields.

12. The packaging machine as set forth in claim 9, wherein the platens have molds therein for pouch formation.

13. The packaging machine as set forth in claim 12, wherein the platens are removably secured to the movers and the platens are replaceable with other platens.

14. The packaging machine as set forth in claim 9, comprising at least one fill station for transferring a product into a mold.

15. The packaging machine as set forth in claim 14, wherein another fill station can be added or removed without modifying other stations.

16. The packaging machine as set forth in claim 9, further comprising a moving filling system, wherein the moving filling system comprises a filling housing that moves generally horizontally and perpendicularly to a movement of the platens while filling molds of the platens with a chemical.

17. The packaging machine as set forth in claim 16, wherein the filling housing includes an array of filling spouts that deposits the chemical into the molds.

18. The packaging machine as set forth in claim 17, wherein the filling spouts are spaced along a cross member, the cross member positioned above the platens, and the cross member having a length to pass over a width of the platens.

19. The packaging machine as set forth in claim 16, wherein the moving filling system further comprises a drive shaft that rotates forward and reverse in order to drive the filling housing.

20. The packaging machine as set forth in claim 16, wherein the filling housing is positioned below a powder spout of the packaging machine, wherein the powder spout remains stationary.

21. The packaging machine as set forth in claim 16, wherein the chemical is a powder detergent.

22. The packaging machine as set forth in claim 1, further comprising a moving filling system, wherein the moving filling system comprises a cross-member that crosses over a top of the platens and positions an array of filling nozzles over the platens to deposit a chemical into molds of the platens.

23. The packaging machine as set forth in claim 22, wherein the moving filling system moves the filling nozzles in a same direction as the molds while filling.

24. The packaging machine as set forth in claim 22, wherein the moving filling system moves the filling nozzles in a same direction as the molds while depositing the chemical into the molds.

25. The packaging machine as set forth in claim 22, wherein the moving filling system comprises a first support member fixedly engaged with a first end of the cross-member and movingly engaged to a support track parallel to the moving direction of the platens, a second support member fixedly engaged with a second end of the cross member movingly engaged with a drive shaft, wherein rotation of the drive shaft moves the cross-member in a direction parallel to the moving direction of the platens.

26. The packaging machine as set forth in claim 22, wherein the moving filling system moves the array of filling nozzles in same direction as the platens and at a faster rate than the platens while filling the molds with the chemical.

27. The packaging machine as set forth in claim 22, wherein the chemical is a liquid detergent.

28. The packaging machine as set forth in claim 1, wherein the vacuum manifold crosses over a top of the platens, and the vacuum nozzles descend vertically from the vacuum manifold.

29. The packaging machine as set forth in claim 28, wherein the vacuum nozzles are positioned to clean only one depression or multiple depressions in a mold of the platen.

30. A packaging machine for film wrapped pouches, comprising:

a track passing through a base film application stage, a filling stage, a lid film application stage;

independent movers engaged to the track, the independent movers carrying platens to the base film application stage, the filling stage, and the lid film application stage;

the independent movers provided with magnets affixed thereto wherein the independent movers are driven through the base film application stage, the filling stage, and the lid film application stage in an upward facing orientation at a slow speed and through a discharge stage and a return stage in a downward facing orientation at faster speeds by magnetic fields of linear motors; and, the platens comprising molds for forming film wrapped pouches; and a vacuum system, wherein the vacuum system comprises a vacuum manifold with vacuum nozzles positioned over the platens and the vacuum system is positioned between a powder fill head and a liquid fill head, wherein the platen moves under the powder fill head, then under the vacuum nozzle, and then under the liquid fill head.

31. The packaging machine as set forth in claim 30, wherein each independent mover carries a single platen.

32. The packaging machine as set forth in claim 30, wherein the linear motors drive the independent movers at varying velocities around the track.

* * * * *